(12) United States Patent
Kawakami et al.

(10) Patent No.: US 11,056,142 B2
(45) Date of Patent: *Jul. 6, 2021

(54) MAGNETIC RECORDING MEDIUM

(71) Applicant: FUJIFILM Corporation, Tokyo (JP)

(72) Inventors: Shinji Kawakami, Otokuni-gun (JP); Sadamu Kuse, Otokuni-gun (JP); Kenji Tanaka, Otokuni-gun (JP); Shinji Tsujimoto, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/397,332

(22) Filed: Apr. 29, 2019

(65) Prior Publication Data
US 2019/0259416 A1 Aug. 22, 2019

Related U.S. Application Data

(63) Continuation-in-part of application No. 14/855,937, filed on Sep. 16, 2015, now abandoned, which is a
(Continued)

(30) Foreign Application Priority Data

Dec. 20, 2010 (JP) ................................. 2010-283276

(51) Int. Cl.
*G11B 5/714* (2006.01)
*G11B 5/706* (2006.01)
*G11B 5/70* (2006.01)

(52) U.S. Cl.
CPC ................ *G11B 5/714* (2013.01); *G11B 5/70* (2013.01); *G11B 5/70678* (2013.01)

(58) Field of Classification Search
CPC ........ G11B 5/70; G11B 5/70678; G11B 5/714
See application file for complete search history.

(56) References Cited

U.S. PATENT DOCUMENTS

2004/0241498 A1 12/2004 Zinbo
2005/0282040 A1 12/2005 Oyanagi et al.
(Continued)

FOREIGN PATENT DOCUMENTS

JP 5-307737 A 11/1993
JP 2001-256633 A 9/2001
(Continued)

OTHER PUBLICATIONS

Japanese Office Action, dated Jan. 10, 2012, for Japanese Application No. 2010-283276.

*Primary Examiner* — Holly Rickman
*Assistant Examiner* — Linda N Chau
(74) *Attorney, Agent, or Firm* — Birch, Stewart, Kolasch & Birch, LLP

(57) ABSTRACT

The magnetic recording medium includes a non-magnetic substrate, a non-magnetic layer, and a magnetic layer, wherein the magnetic layer contains a hexagonal strontium ferrite magnetic powder, Mr and t satisfy $0.0020\ \mu T \cdot m \leq Mr \cdot t \leq 0.0150\ \mu T \cdot m$, where Mr is the residual magnetic flux density of the magnetic layer, and t is the average thickness of the magnetic layer, L1 satisfies $2\ nm \leq L1 \leq 6\ nm$, where L1 is the average thickness of a first mixed layer that is formed on the surface of the magnetic layer opposite to the non-magnetic layer, L2 satisfies $0.1 \leq L2/t \leq 0.45$, where L2 is the average thickness of a second mixed layer that is formed on the surface of the magnetic layer facing the non-magnetic layer.

6 Claims, 2 Drawing Sheets

Related U.S. Application Data continuation of application No. 13/330,219, filed on Dec. 19, 2011, now Pat. No. 9,165,586.

(56) References Cited

U.S. PATENT DOCUMENTS

| | | |
|---|---|---|
| 2006/0141294 A1 | 6/2006 | Nishida et al. |
| 2007/0236835 A1 | 10/2007 | Oyanagi et al. |
| 2008/0107921 A1 | 5/2008 | Kuse et al. |
| 2011/0242698 A1 | 10/2011 | Lowery et al. |

FOREIGN PATENT DOCUMENTS

| | | |
|---|---|---|
| JP | 2007-294083 A | 11/2007 |
| JP | 2010-218653 A | 9/2010 |

MAGNETIC RECORDING MEDIUM

CROSS-REFERENCE TO RELATED APPLICATIONS

This application is a Continuation-in-Part of copending application Ser. No. 14/855,937 filed on Sep. 16, 2015, which is a Continuation of application Ser. No. 13/330,219 filed on Dec. 19, 2011, which claims priority under 35 U.S.C. § 119(a) to Application No. 2010-283276, filed in Japan on Dec. 20, 2010, all of which are hereby expressly incorporated by reference into the present application.

BACKGROUND OF INVENTION

1. Field of the Invention

The present invention relates to large-capacity magnetic recording media, and in particular to a magnetic recording medium having superior magnetic recording properties and transport characteristics.

2. Description of Related Art

Magnetic tape, which is one type of magnetic recording media, has a variety of applications such as audiotape, videotape and computer tape. Especially, in the field of computer data backup tape, tapes having a recording capacity of several hundred gigabytes per reel have been commercially available as the capacity of hard disks to be backed up has increased. In the future, it will be essential to increase the capacity of such data backup tape in order to support further increases in the capacity of hard disks.

With regard to a magnetic tape for use as the data backup tape mentioned above, the recording wavelength has been shortened with the further increase in the recording capacity, and in order to reduce thickness loss during recording/reproduction, an effort has been made to reduce the thickness of the magnetic layer of the tape. To achieve the reduction in the thickness of the magnetic layer, a magnetic recording medium having a multilayered structure has been adopted. In the multilayered magnetic recording medium, a non-magnetic layer is provided on a non-magnetic substrate and a magnetic layer is further provided on the non-magnetic layer.

For such a multilayered magnetic recording medium, studies have been conducted to reduce noise by reducing variations in the interface between the magnetic layer and the non-magnetic layer (see JP 2001-256633 A, for example). Further, there has been proposed a magnetic recording medium in which the average thickness of the magnetic layer and $\sigma_d$ as the standard deviation of the magnetic substance distribution in the thickness direction of the magnetic layer, in particular in the interface between the magnetic layer and the non-magnetic layer are specified (see JP 2007-294083 A, for example).

JP 2001-256633 A discloses a multilayered magnetic recording medium in which d as the average thickness of the magnetic layer is 0.01 to 0.3 µm, and the ratio of σ as the standard deviation of the thickness of the magnetic layer to d as the average thickness of the magnetic layer (σ/d) is ≤0.5.

Further, JP 2007-294083 A discloses a magnetic recording medium in which δ as the average thickness of the magnetic layer is 10 to 100 nm, and $\sigma_d$ as the standard deviation is 5 to 50 nm in terms of coating layer in the magnetic recording medium, where $\sigma_d$ is obtained by measuring by TOF-SIMS a depth profile of an element present only in the magnetic layer among elements constituting the ferromagnetic powder and subjecting a differential curve of the depth profile to a normal distribution curve fitting.

In JP 2001-256633 A, a picture of the cross section of the magnetic layer is taken under a transmission electron microscope (IBM), the surface of the magnetic layer and the interface between the magnetic layer and the non-magnetic layer are each traced to determine the thickness of the magnetic layer at each point, and the standard deviation is determined relative to the variations in the thickness. On the other hand, in JP 2007-294083 A, attention is focused upon the element present only in the magnetic layer. The depth profile of the element in the interface between the magnetic layer and the non-magnetic layer is measured, and the standard deviation relative to the variations in the interface is determined from the depth profile curve. For a standardization purpose, when $\sigma_d$ as the standard deviation of the variations in the interface is divided by δ as the average thickness of the magnetic layer in JP 2007-294083 A, $\sigma_d/\delta$ is ≤0.5. This indicates that JP 2007-294083 A has the same technical principles as those of JP 2001-256633 A.

By such techniques, improved magnetic conversion characteristics can be expected. However, such techniques may be not sufficient for obtaining a magnetic recording medium having not only improved magnetic conversion characteristics but also superior transport characteristics and durability.

With the foregoing in mind, it is an object of the present invention to provide a magnetic recording medium having not only superior magnetic conversion characteristics but also superior transport characteristics.

SUMMARY OF THE INVENTION

The magnetic recording medium of the present invention is a magnetic recording medium including: a non-magnetic substrate; a non-magnetic layer formed on one of principal surfaces of the non-magnetic substrate; and a magnetic layer formed on a principal surface of the non-magnetic layer opposite to the non-magnetic substrate. Mr and t satisfy 0.0020 µT·m≤Mr·t≤0.0150 µT·m, where Mr is the residual magnetic flux density of the magnetic layer, and t is the average thickness of the magnetic layer, L1 satisfies 2 nm≤L1≤6 nm, where L1 is the average thickness of a first mixed layer that is formed on the surface of the magnetic layer opposite to the non-magnetic layer, and L2 satisfies 0.1≤L2/t≤0.45, where L2 is the average thickness of a second mixed layer that is formed on the surface of the magnetic layer facing the non-magnetic layer.

According to the present invention, the magnetization of the magnetic layer is controlled at an adequate level. Therefore, it is possible to provide a magnetic recording medium having superior magnetic recording properties as well as transport characteristics and with no output waveform distortion even when read by a high-sensitive GMR head.

DETAILED DESCRIPTION OF THE INVENTION

Figure 1A:
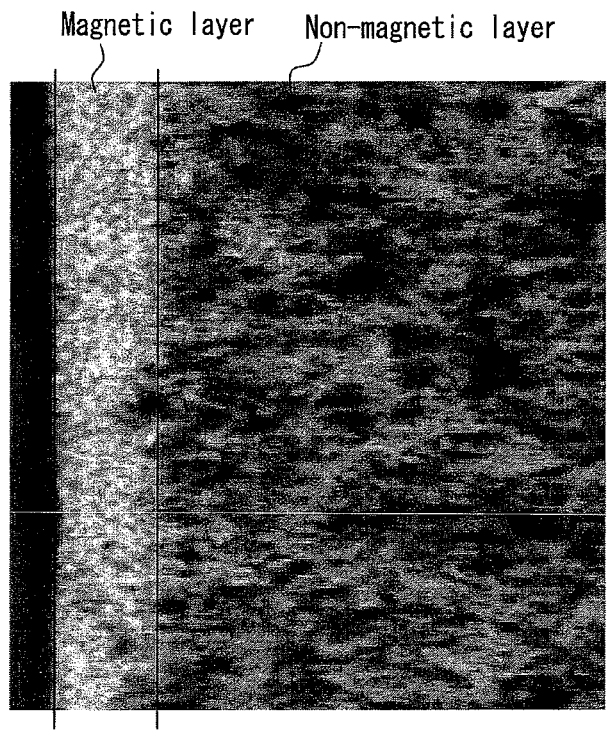
FIG. 1A is a cross-sectional image of a magnetic recording medium.

The magnetic recording medium of the present invention is a magnetic recording medium including: a non-magnetic substrate; a non-magnetic layer formed on one of principal surfaces of the non-magnetic substrate; and a magnetic layer formed on a principal surface of the non-magnetic layer opposite to the non-magnetic substrate. Mr and t satisfy 0.0020 µT·m≤Mr·t≤0.0150 µT·m, where Mr is the residual magnetic flux density of the magnetic layer, and t is the average thickness of the magnetic layer, L1 satisfies 2 nm≤L1≤6 nm, where L1 is the average thickness of a first mixed layer that is formed on the surface of the magnetic layer opposite to the non-magnetic layer, and L2 satisfies 0.1≤L2/t≤0.45, where L2 is the average thickness of a second mixed layer that is formed on the surface of the magnetic layer facing the non-magnetic layer.

Since Mr and t are set to satisfy 0.0020 µT·m≤Mr·t≤0.0150 µT·m, the magnetic recording medium of the present invention has a large recording density. Furthermore, the first mixed layer and the second mixed layer are set such that L1 and L2 satisfy 2 nm≤L1≤6 nm and 0.1≤L2/t≤0.45, respectively. Thus, the magnetic recording medium of the present invention has superior magnetic conversion characteristics and transport characteristics.

Previous to this invention, the present inventors proposed in JP 2008-128672 A a method by which the thickness of layers of different element compositions included in a structure can be measured without being affected by human decisions and without inaccuracies such as variations in value depending on the conditions. In the present invention, t as the average thickness of the magnetic layer is defined as being determined in the following manner (hereinafter referred to as the "layer thickness measuring method of the present invention") on the basis of the previously proposed layer thickness measuring method.

In the layer thickness measuring method of the present invention, first, a carbon layer having a thickness of about 50 to 100 nm is formed by sputtering on the surface of the magnetic layer of the magnetic recording medium to be measured. Then, a Pt—Pd layer having a thickness of about 50 to 100 nm is further formed by sputtering on the carbon layer. Next, for a sample including the carbon layer, the Pt—Pd layer, the magnetic layer and the non-magnetic layer, its cross section is obtained using a focused ion beam (FIB) system. The cross section obtained is then observed under a scanning electron microscope (SEM) equipped with a YAG (Yttrium Aluminum Garnet) detector to obtain a backscattered electron (BSE) image of the cross section at an acceleration voltage of 7 kV. When taking the image, the surface of the magnetic layer is positioned to so as to be parallel to a vertical axis (Y-axis) and perpendicular to a horizontal axis (X-axis). Subsequently, the data of the image is digitalized to obtain data on the luminance of the image in the thickness direction, and a luminance curve is created from the image luminance data.

In the digitalization of the image, the cross-sectional image obtained (e.g., FIG. 1) is divided into a certain number of areas in the X-axis direction (the thickness direction of each layer) as well as in the Y-axis direction (the plane direction of each layer), and the luminance of the divided image at each coordinate point is converted into a certain levels of gray scale. More specifically, when the cross-sectional image is obtained in the form of a picture, the picture is read using a scanner to convert the picture into digital data, and the data is subjected to, for example, 8-bit processing, thus obtaining 256-level (0 to 255) gray scale data on the luminance. In the present case, the image is divided into 2560 areas in the Y-axis direction at the time of obtaining the luminance data. Even when the cross-sectional image is obtained through a photoelectric conversion element such as a CCD, digital data of the cross-sectional image at each coordinate point can be obtained by converting the image into digital data Next, the values of luminance (e.g., 2560 values of luminance) of the obtained two dimensional data at each X coordinate are averaged in the Y coordinate direction, thus obtaining a luminance curve, which is averaged in the Y-axis direction as the coating thickness direction. The luminance curve thus obtained is subjected to a moving average processing in the X-axis direction (11 points in total, that is, one point together with 5 points before that point and 5 points after that point), to obtain the luminance curve as shown in FIG. 1B.

Finally, the luminance curve is differentiated to create a differential curve. The boundary of each layer is determined from the positions of the peaks of the differential curve, and t as the average thickness of the magnetic layer is determined from the distance between the peaks.

Moreover, as a result of pursuing the study thereafter, the present inventors have found correlations between the shape of the luminance curve and the magnetic recording properties and transport durability of a magnetic recording medium. This will be explained with reference to FIGS. 1A to 1C.

Figure 1B:
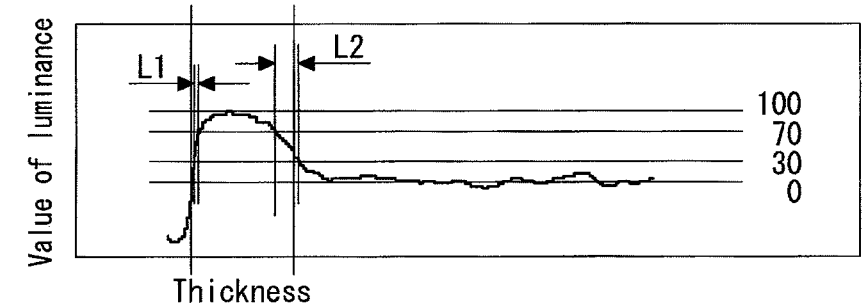
FIG. 1B is a graph showing the luminance (luminance curve) of the cross section of the magnetic recording medium shown in FIG. 1A.
Figure 1C:
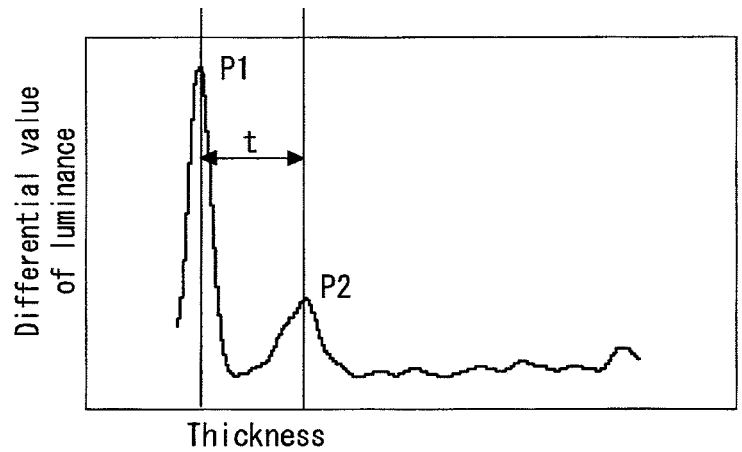
FIG. 1C is a graph showing a differential curve of the luminance curve shown in FIG. 1B.

FIG. 1A is a cross-sectional image of a magnetic recording medium as one example of the present invention, which image is taken under a scanning electron microscope (SEM). FIG. 1B is a graph showing the luminance (luminance curve) of the cross section of the magnetic recording medium shown in FIG. 1A, and FIG. 1C is a graph showing a differential curve of the luminance curve shown in FIG. 1B. In the present invention, t as the average thickness of the magnetic layer is defined as the distance between the peaks P1 and P2 of the differential curve shown in FIG. 1C. Further, the first mixed layer and the second mixed layers are defined in the present invention as follows. That is, when an average of luminance of the non-magnetic layer is taken as 0 and the highest luminance of the magnetic layer is taken as 100, the first mixed layer is an area (defined by the average thickness L1) on the side of the magnetic layer opposite to the non-magnetic layer and where the luminance is in a range of 70 to 30, and the second mixed layer is an area (defined by the average thickness L2) on the side of the magnetic layer facing the non-magnetic layer and where the luminance is in a range of from 70 to 30. As a result, L1 as the average thickness of the first mixed layer and L2 as the average thickness of the second mixed layer can be determined clearly.

The area referred to as the magnetic layer defined by the thickness t is of a nearly pure magnetic layer except the portions overlapping with the first mixed layer and the second mixed layer. In contrast, the area of the first mixed layer is considered as an area that is high in, for example, lubricant, resin, filler and void contents as compared with the magnetic layer, and the area of the second mixed layer is considered as an area in which the components of the non-magnetic layer are blended.

The study conducted by the present inventors has revealed that L1 as the average thickness of the first mixed layer has a correlation with an SN ratio in terms of transport duration and magnetic recording properties, and L2 as the average thickness of the second mixed layer has a correlation with an SN ratio in terms of magnetic recording properties.

The first mixed layer is a mixed layer formed on the surface of the magnetic layer, and is considered as an area that is high in, for example, lubricant, resin, filler and void contents as compared with the magnetic layer. It is considered that since these components are present in the first mixed layer adequately, the transport durability of the magnetic recording medium becomes favorable without significant deterioration of the magnetic recording properties, which in turn improves the practical characteristics.

L1 as the average thickness of the first mixed layer is set within a range of $2\ nm \leq L1 \leq 6$ nm, and more preferably $2\ nm \leq L1 \leq 4$ nm. When L1 is less than 2 nm, the transport durability deteriorates as, for example, the lubricant, resin, filler and void contents on the surface of the magnetic layer decline. On the other hand, when L1 is larger than 6 nm, the space between the magnetic layer and the magnetic head widens. This may cause an increase in spacing loss during recording/reproduction, which in turn deteriorates the electromagnetic characteristics.

Although methods of controlling L1 within the aforementioned range are not particularly limited, the following examples may be used preferably.

(1) Adjusting the amount of lubricant added to be 0.5 to 5.0% by mass of the entire magnetic layer; adjusting the BET specific surface area of the magnetic powder in the magnetic layer to be 60 to 110 $m^2/g$; adjusting the BET specific surface area of the non-magnetic powder in the non-magnetic layer to be 30 to 90 $m^2/g$; adopting a line pressure of 196 to 294 kN/m and a temperature of 70 to 120° C. as conditions under which calendering is performed; and coating a lubricant on top of the magnetic layer to increase the amount of the lubricant on the surface of the magnetic layer.

To be more specific, a lubricant added to a paint during a paint preparation process will be separated broadly into two types in the magnetic layer and the non-magnetic layer formed afterward; the lubricant that primarily adheres to the magnetic powder, the filler and the like, and the lubricant that is present in voids in a free state without adhering to the magnetic powder, the filler and the like. Here, when the amount of the lubricant added is increased, the lubricant that seeps into the surface of the magnetic layer increases in amount, which in turn increases L1. On the other hand, when the magnetic powder and the non-magnetic powder have a large BET specific surface area, the lubricant that adheres to the surface of the magnetic powder increases in amount, whereas the amount of the lubricant that is present in a free state and does not adhere to the surface of the magnetic powder declines. As a result, the lubricant that seeps into the surface of the magnetic layer declines in amount, which in turn reduces L1. Further, when high linear pressure and temperature are adopted as calendering conditions, projections on the surface of the magnetic layer as one constituent element of L1 are reduced, which in turn reduces L1. Further, since coating a lubricant on top of the magnetic layer increases the amount of the lubricant on the surface of the magnetic layer, L1 increases.

(2) Controlling the amount of binder resin added and controlling the amount of binder on the surface of the magnetic layer through, for example, kneading the magnetic powder and adjusting the degree of surface treatment to which the magnetic powder is subjected To be more specific, an increase in the amount of a binder resin added leads to an increase in the amount of the binder resin on the surface of the magnetic layer that does not adhere to the surface of the magnetic powder, which in turn increases L1. Further, the amount of the binder resin that adheres to the surface of the magnetic powder can be reduced by subjecting the magnetic powder to a surface treatment. This results in an increase in the amount of the binder resin on the surface of the magnetic layer that does not adhere to the surface of the magnetic powder, which in turn increases L1. However, when the dispersion state of the paint changes due to kneading and the amount of the binder resin that adheres to the surface of the magnetic powder increases, the amount of the binder on the surface of the magnetic layer declines, which in turn reduces L1.

(3) Controlling the amount of filler on and voids in the surface of the magnetic layer by adjusting the amount of the filler added and the timing of adding the filler and subjecting the filler to a surface treatment To be more specific, an increase in the amount of the filler added leads to an increase in the amount of the filler present on the surface of the magnetic layer as the amount of the filler in the magnetic layer increases. Thus, L1 increases. Further, the later the timing of adding the filler in the paint preparation process, the less likely it becomes for the added filler to be dispersed. This leads to an increase in the amount of the filler present on the surface of the magnetic layer, which in turn increases L1. Furthermore, when the filler is subjected to a surface treatment, the amount of the binder resin that adheres to the surface of the magnetic powder declines. As a result, the binder resin that does not adhere to the surface of the magnetic powder and is present on the surface of the magnetic layer increases in amount, which in turn increases L1.

(4) Polishing, subsequent to the formation of the magnetic layer, the surface of the magnetic layer with a blade, lapping tape, polishing wheel, etc. so as to directly control the thickness of the first mixed layer As a result of treating the surface of the magnetic layer with a blade, lapping tape, polishing wheel, etc., subsequent to the formation of the magnetic layer, such components as the lubricant and the filler present on the surface of the magnetic layer are removed. Thus, L1 declines.

In the present invention, a magnetic recording medium in which L1 is controlled to be within the aforementioned range can be produced by using one of the methods described above alone, and preferably by using some of the methods described above in combination.

The second mixed layer is a mixed layer that is formed between the magnetic layer and the non-magnetic layer. Ideally, the second mixed layer does not exist. In reality, however, the second mixed layer having a certain level of thickness is formed due to the following reasons. When employing simultaneous multilayer coating in which the magnetic layer is formed on the non-magnetic layer before the non-magnetic layer is dried, the second mixed layer is formed because the non-magnetic paint and the magnetic paint get mixed with each other at the interface between the magnetic layer and the non-magnetic layer. Further, when employing successive multilayer coating in which the magnetic layer is formed on the non-magnetic layer after the non-magnetic layer is dried, the second mixed layer is formed due to the roughness of the surface of the non-magnetic layer, the entry of the magnetic paint into voids in the non-magnetic layer, and irregularities at the interface caused by melting of the surface of the non-magnetic layer at the time of applying the magnetic paint.

t as the average thickness of the magnetic layer and L2 as the average thickness of the second mixed layer are set to satisfy $0.1 \leq L2/t \leq 0.45$, and preferably $0.1 \leq L2/t \leq 0.40$. The smaller the value of L2, the more preferable it is. Ideally, L2 is most preferably 0. In reality, however, a lower limit to L2/t may be about 0.1 due to technical limitations. Further, when L2/t is larger than 0.45, L2 as the average thickness of the second mixed layer becomes too large relative tot as the average thickness of the magnetic layer. This leads to a reduction in the amount of the magnetic powder effective in recording/reproduction, whereby the SN ratio tends to decline.

Although methods of controlling L2/t within the aforementioned range are not particularly limited, the following examples may be used preferably.

(1) Bringing the rheology characteristics of the non-magnetic paint and those of the magnetic paint closer to each other as much as possible when forming the non-magnetic layer and the magnetic layer by simultaneous multilayer coating.

If the theology characteristics of the non-magnetic paint and those of the magnetic paint are brought closer to each other as much as possible when performing simultaneous multilayer coating, the non-magnetic paint and the magnetic paint are less mixed with each other at the interface. As a result, variations in the thickness of the magnetic layer are reduced, which in turn reduces L2.

(2) Using a pump that does not cause pulsation as a pump for supplying each paint to an applicator when forming the non-magnetic layer and the magnetic layer by simultaneous multilayer coating.

When the non-magnetic paint and the magnetic paint are supplied without pulsation, variations in the coating thickness of each paint can be suppressed, which in turn reduces L2.

(3) Preventing a deviation of high-frequency vibrational components from developing in the speed of transporting the non-magnetic substrate when forming the non-magnetic layer and the magnetic layer.

When the deviation of high-frequency vibrational components in the speed of transporting the non-magnetic substrate is reduced, so-called flopping of the non-magnetic substrate does not occur. As a result, variations in the coating thickness can be suppressed, which in turn reduces L2.

(4) When forming the non-magnetic layer and the magnetic layer by successive multilayer coating, after forming and drying the non-magnetic layer, subjecting the non-magnetic layer to calendering so as to make it smooth and curing the non-magnetic layer by heat or radiation to crosslink the non-magnetic layer so as to prevent the surface of the non-magnetic layer from melting when forming the magnetic layer.

The non-magnetic layer and the magnetic layer are less mixed with each other at the interface by these methods. As a result, variations in the thickness of the magnetic layer are reduced, which in turn reduces L2.

(5) Forming a resin layer on the surface of the non-magnetic layer and curing the resin layer by crosslinking thereafter so as to prevent the magnetic paint from seeping into the non-magnetic layer when forming the magnetic layer.

The magnetic layer and the resin layer are less mixed with each other at the interface by this method. As a result, variations in the thickness of the magnetic layer are reduced, which in turn reduces L2.

Figure 2:
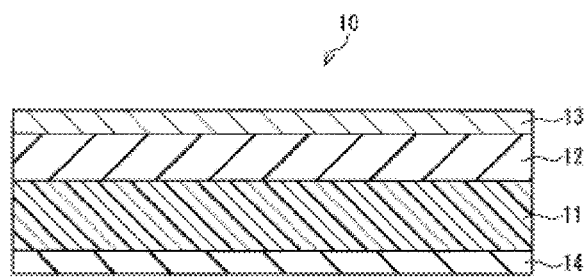
FIG. 2 is a schematic cross-sectional view of one example of the magnetic recording medium of the present invention.

In the present invention, a magnetic recording medium in which L2/t is controlled to be within the aforementioned range can be produced by using one of the methods described above alone, and preferably by using some of the methods described above in combination Hereinafter, the magnetic recording medium of the present invention will be described with reference to the drawings. FIG. 2 is a schematic cross-sectional view of a magnetic tape as one example of the magnetic recording medium of the present invention A magnetic tape 10 shown in FIG. 2 includes a non-magnetic substrate 11, a non-magnetic layer 12 formed on one of the principal surfaces (here, on the upper surface) of the non-magnetic substrate 11 and a magnetic layer 13 formed on the principal surface (here, on the upper surface) of the non-magnetic layer 12 opposite to the non-magnetic substrate 11. Furthermore, a backcoat layer 14 is formed on the principal surface (here, on the lower surface) of the non-magnetic substrate 11 on which the non-magnetic layer 12 is not formed. Since the backcoat layer is not essential, it may not be provided.

Non-Magnetic Layer

The non-magnetic layer 12 is a layer that contains a non-magnetic powder, a binder and a lubricant.

Examples of the non-magnetic powder contained in the non-magnetic layer 12 include carbon black, titanium oxide, iron oxide and aluminum oxide. Generally, carbon black is used alone, or carbon black is mixed with another non-magnetic powder such as titanium oxide, iron oxide or aluminum oxide and the mixture is used. In order to form a coating having little unevenness in thickness to form the smooth non-magnetic layer 12, it is preferable to use a non-magnetic powder having a sharp particle size distribution. The average particle size of the non-magnetic powder is, for example, preferably 10 to 1000 nm, and more preferably 10 to 500 nm in terms of ensuring the uniformity, surface smoothness, and rigidity of the non-magnetic layer 12 as well as ensuring the conductivity.

The particle shape of the non-magnetic powder contained in the non-magnetic layer 12 may be a spherical, platelet, needle-like, or spindle-like shape. With regard to the average particle size of a needle-like or spindle-like non-magnetic powder, the average major axis diameter is preferably 10 to 300 nm, and the average minor axis diameter is preferably 5 to 200 nm. The average particle size of a spherical non-magnetic powder is preferably 5 to 200 nm, and more preferably 5 to 100 nm. The average particle size of a platelet non-magnetic powder is preferably 10 to 200 nm in terms of the largest plate diameter. Furthermore, in order to form the non-magnetic layer 12 that is smooth and has little unevenness in thickness, a non-magnetic powder having a sharp particle size distribution is preferably used. It should be noted that the "average particle size of a powder" as used herein means a number-average value of the particle size of 300 particles in a picture of the powder taken under a transmission electron microscope (TEM).

Conventionally-known thermoplastic resins, thermosetting resins, and the like can be used as the binder contained in the non-magnetic layer 12. Specific examples of the thermoplastic resins include a vinyl chloride resin, a vinyl chloride-vinyl acetate copolymer resin, a vinyl chloride-vinyl alcohol copolymer resin, a vinyl chloride-vinyl acetate-vinyl alcohol copolymer resin, a vinyl chloride-vinyl acetate-maleic anhydride copolymer resin, a vinyl chloride-hydroxyl group-containing alkyl acrylate copolymer resin, and a polyester polyurethane resin. Specific examples of the thermosetting resins include a phenolic resin, an epoxy resin, a polyurethane resin, a urea resin, a melamine resin, and an alkyd resin. Among these binders, those having a functional group are preferable in order to enhance the dispersibility of the non-magnetic powder and to improve the filling properties. Specific examples of such a functional group include COOM, $SO_3M$, $OSO_3M$, $P=O(OM)_3$, $O-P=O(OM)_2$ (where M is a hydrogen atom, an alkali metal salt, or an amine salt), OH, NR1R2, NR3R4R5 (where R1, R2, R3, R4 and R5 are hydrogen or a hydrocarbon group, which usually has a carbon number of 1 to 10), and an epoxy group. When using two or more types of resins in combination, it is preferable to use resins whose functional groups have the same polarity, and, in particular, a combination of resins having an $SO_3M$ group is preferable. The content of these binders is preferably 7 to 50 parts by mass, and more preferably 10 to 35 parts by mass with respect to 100 parts by mass of the non-magnetic powder. In particular, it is preferable to use 5 to 30 parts by mass of a vinyl chloride resin and 2 to 20 parts by mass of a polyurethane resin in combination.

Further, radiation curable resins may be used as the binder instead of or in combination with a thermosetting resin such as described above. Examples of the radiation curable resins include a (meth)acrylic monomer and a (meth)acrylic oligomer. In particular, a radiation curable resin having two or more double bonds in each molecule and having a weight-average molecular weight of 50 to 300 per double bond is preferable. Specific examples of such radiation curable resins include: bifunctional (meth)acrylates such as 1,3-butanediol di(meth)acrylate, 1,4-butanediol di(meth)acrylate, 1,6-hexanediol di(meth)acrylate, ethylene glycol di(meth)acrylate, diethylene glycol di(meth)aciylate, triethylene glycol di(meth)acrylate, tetraethylene glycol di(meth)aciylate, polyethylene glycol di(meth)acrylate, propylene glycol di(meth)acrylate, dipropylene glycol di(meth)aciylate, tripropylene glycol di(meth)acrylate, ethoxylated bisphenol A di(meth)aciylate, novolac di(meth)acrylate, and propoxylated neopentyl glycol di(meth)acrylate; trifunctional (meth)acrylates such as tris(2-hydroxyethyl) isocyanurate tri(meth)acrylate, trimethylolpropane tri(meth)acrylate, ethoxylated trimethylolpropane tri(meth)acrylate, pentaerythritol tri(meth)acrylate, propoxylated trimethylolpropane tri(meth)acrylate, propoxylated glyceryl tri(meth)acrylate, caprolactone modified trimethylolpropane tri (meth)acrylate; tetrafunctional or higher functional (meth) acrylates such as pentaerythritol tetra(meth)acrylate, ditrimethylolpropane tetra(meth)acrylate, ethoxylated pentaerythritol tetra(meth)acrylate, dipentaerythritol hydroxy penta(meth)aciylate, and dipentaerythritol hexa(meth)acrylate; and oligomers obtained by performing molecular chain extension of the above-described monomers with, for example, a polyether, polyester, polycarbonate, or polyurethane backbone. The content of the radiation curable resin in the non-magnetic layer 12 is preferably 5 to 30% by mass with respect to the combined amount of any other binder and the radiation curable resin.

Further, it is preferable to use, along with the above-described binder, a thermosetting crosslinking agent that binds to the functional group or the like contained in the binder and forms a crosslinking structure. Specific examples of the crosslinking agent include isocyanate compounds such as tolylene diisocyanate, hexamethylene diisocyanate, and isophorone diisocyanate; reaction products of an isocyanate compound and a compound, such as trimethylolpropane, having a plurality of hydroxyl groups; and various types of polyisocyanate such as a condensation product of an isocyanate compound. The content of the crosslinking agent is preferably 10 to 50 parts by mass with respect to 100 parts by mass of the binder.

Examples of the lubricant contained in the non-magnetic layer 12 include a conventionally-known fatty acid having a carbon number of 10 to 30. Although the fatty acid may be any of a straight-chain fatty acid, a branched-chain fatty acid, and a cis-trans isomer, a straight-chain fatty acid, which has excellent lubricating ability, is preferable. Specific examples of such a fatty acid include lauric acid, myristic acid, stearic acid, palmitic acid, behenic acid, oleic acid, and linoleic acid. These fatty acids may be used alone or in combination of two or more. The content of the fatty acid in the non-magnetic layer 12 is preferably 0.2 to 5 parts by mass with respect to 100 parts by mass of the non-magnetic powder. A fatty acid content of 0.2 parts by mass or more can cause the fatty acid to sufficiently seep from the non-magnetic layer 12 into the magnetic layer 13, and therefore can improve the transport durability of the magnetic tape in a low-humidity environment even more. A fatty acid content of 5 parts by mass or less can ensure the toughness of the non-magnetic layer 12.

Furthermore, the non-magnetic layer 12 may contain, along with the above-described fatty acid, a conventionally-known fatty acid ester or fatty acid amide as the lubricant. Specific examples of the fatty acid ester include n-butyl oleate, hexyl oleate, n-octyl oleate, 2-ethylhexyl oleate, oleyl oleate, n-butyl laurate, heptyl laurate, n-butyl myristate, n-butoxyethyl oleate, trimethylolpropane trioleate, n-butyl stearate, s-butyl stearate, isoamyl stearate, and butyl cellosolve stearate. Specific examples of the fatty acid amide include palmitic acid amide and stearic acid amide. These fatty acid esters and fatty acid amides may be used alone or in combination of two or more. The combined content of the fatty acid ester and the fatty acid amide in the non-magnetic layer 12 is preferably 0.2 to 10 parts by mass with respect to 100 parts by mass of the non-magnetic powder. A fatty acid ester and fatty acid amide content of 0.2 parts by mass or more can cause the lubricant to sufficiently seep from the non-magnetic layer 12 into the magnetic layer 13, which in turn can reduce the coefficient of friction even more. A lubricant content of 10 parts by mass or less can ensure the toughness of the non-magnetic layer 12. In particular, it is preferable that 0.5 to 4 parts by mass of fatty acid and 0.2 to 3 parts by mass of fatty acid ester are contained with respect to 100 parts by mass of the non-magnetic powder. A fatty acid content of less than 0.5 parts by mass will result in a decreased effect of reducing the coefficient of friction, and a fatty acid content of more than 4 parts by mass will cause plasticization of the non-magnetic layer 12, which may lead to a loss of toughness. Further, a fatty acid ester content of less than 0.2 parts by mass will result in a decreased effect of reducing the coefficient of friction, and a fatty acid ester content of more than 3 parts by mass will cause an excessive amount of lubricant to be introduced into the magnetic layer 13, and therefore, an adverse effect including, for example, sticking of the magnetic tape to the magnetic head may occur.

The non-magnetic layer 12 may further contain conventionally-known additives such as a dispersing agent and a polishing agent, as long as it contains the non-magnetic powder, the binder and the lubricant, which are described above.

Specific examples of the dispersant include: fatty acids having a carbon number of 12 to 18 (RCOOH (where R is an alkyl group or alkenyl group having a carbon number of 11 to 17)) such as caprylic acid, capric acid, lauric acid, myristic acid, palmitic acid, stearic acid, behenic acid, oleic acid, elaidic acid, linoleic acid, linolenic acid and stearolic acid; metal soaps made of alkali metals or alkali earth metals of the above-described fatty acids; compounds containing fluorine of the above-described fatty acid esters; amides of the above-described fatty acids; polyalkylene oxide alkylphosphate; lecithin; trialkyl polyolefin oxy-quaternary ammonium salt (where alkyl has a carbon number of 1 to 5 and olefin is ethylene, propylene or the like); phenylphosphonic acid; and copper phthalocyanine. These may be used alone or in combination. The content of the dispersant is preferably 0.2 to 5 parts by mass with respect to 100 parts by mass of the non-magnetic powder.

With regard to the polishing agent, it is possible to use a polishing agent similar to the polishing agent for use in the magnetic layer 13 described later.

The non-magnetic layer 12 has a thickness of preferably 0.1 to 3 and more preferably 0.1 to 1.2 When the non-magnetic layer 12 has a thickness of 0.1 µm or more, it is possible to contain the lubricant in the non-magnetic layer 12 in amount sufficient for ensuring the transport durability. On the other hand, when the non-magnetic layer 12 has a thickness of 3 µm or less, it is possible to avoid the magnetic tape from having a large overall thickness unnecessarily, which in turn allows an increase in the recording capacity per volume.

Methods of forming the non-magnetic layer 12 are not particularly limited. The non-magnetic layer 12 may be formed by dispersing the components for forming the non-magnetic layer such as the non-magnetic powder, the binder and the lubricant described above in a solvent to prepare a non-magnetic paint, applying the non-magnetic paint on the principal surface of the non-magnetic substrate 11 (described later) and drying the applied paint. For example, tetrahydrofuran, cyclohexanone, methylethylketone, toluene or the like can be used as the solvent.

Magnetic Layer

The magnetic layer 13 is a layer that contains a magnetic powder and a binder.

Specific examples of the magnetic powder contained in the magnetic layer 13 include hexagonal ferrite magnetic powder, ferromagnetic metallic iron magnetic powder, and iron nitride magnetic powder. The average particle size of the magnetic powder is preferably 10 to 35 nm, and more preferably 15 to 25 nm. An average particle size of 10 nm or more will allow for preparation of a magnetic paint having excellent dispersibility. On the other hand, an average particle size of 35 nm or less can reduce particle noise. It should be noted that the "average particle size" of a magnetic powder refers to an average major axis diameter in the case of a needle-like magnetic powder, the largest plate diameter in the case of a platelet magnetic powder, or the largest diameter in the case of a spherical or ellipsoidal magnetic powder having a ratio of the major axis length to the minor axis length within a range of 1 to 3.5.

As the magnetic powder included in the magnetic layer, magnetic powder known as magnetic powder used in the magnetic layer of various magnetic recording media can be used. It is preferable to use magnetic powder having a small average particle size, from a viewpoint of improvement of recording density. From this viewpoint, an average particle size of the magnetic powder is preferably equal to or smaller than 50 nm, more preferably equal to or smaller than 45 nm, even more preferably equal to or smaller than 40 nm, still preferably equal to or smaller than 35 nm, still preferably equal to or smaller than 30 nm, still more preferably equal to or smaller than 25 nm, and still even more preferably equal to or smaller than 20 nm. Meanwhile, the average particle size of the magnetic powder is preferably equal to or greater than 5 nm, more preferably equal to or greater than 8 nm, even more preferably equal to or greater than 10 nm, still preferably equal to or greater than 15 nm, and still more preferably equal to or greater than 20 nm, from a viewpoint of stability of magnetization.

Hexagonal Ferrite Powder

As a preferred specific example of the magnetic powder, hexagonal ferrite powder can be used. For details of the hexagonal ferrite powder, descriptions disclosed in paragraphs 0012 to 0030 of JP2011-225417A, paragraphs 0134 to 0136 of JP2011-216149A, paragraphs 0013 to 0030 of JP2012-204726A, and paragraphs 0029 to 0084 of JP2015-127985A can be referred to, for example.

In the invention and the specification, the "hexagonal ferrite powder" is to be understood to mean magnetic powder from which a hexagonal ferrite type crystal structure can be detected as a main phase by X-ray diffraction analysis. The main phase is to be understood to mean a structure to which the diffraction peak with the highest intensity in an X-ray diffraction spectrum obtained by X-ray diffraction analysis is assigned. For example, when the diffraction peak with the highest intensity in an X-ray diffraction spectrum obtained by X-ray diffraction analysis is assigned to the hexagonal ferrite type crystal structure, it shall be determined that the hexagonal ferrite type crystal structure is detected as a main phase. When a single structure is only detected by X-ray diffraction analysis, this detected structure is determined as a main phase. The hexagonal ferrite type crystal structure at least contains, as constitutional atoms, an iron atom, a divalent metal atom, and an oxygen atom. A divalent metal atom is a metal atom which can convert into a divalent cation as an ion thereof, and examples thereof include alkaline earth metal atoms, such as a strontium atom, a barium atom, and a calcium atom, and a lead atom. In the invention and the specification, the hexagonal strontium ferrite powder is to be understood to mean powder in which a main divalent metal atom contained therein is a strontium atom, and the hexagonal barium ferrite powder is to be understood to mean powder in which a main divalent metal atom contained therein is a barium atom. The main divalent metal atom is to be understood to mean a divalent metal atom having the highest content in terms of atom % among divalent metal atoms contained in this powder. However, the divalent metal atom does not include rare earth atoms. In the invention and the specification, the rare earth atoms are selected from the group consisting of a scandium atom (Sc), an yttrium atom (Y), and a lanthanoid atom. The lanthanoid atom is selected from the group consisting of a lanthanum atom (La), a cerium atom (Ce), a praseodymium atom (Pr), a neodymium atom (Nd), a promethium atom (Pm), a samarium atom (Sm), an europium atom (Eu), a gadolinium atom (Gd), a terbium atom (Tb), a dysprosium atom (Dy), a holmium atom (Ho), an erbium atom (Er), a thulium atom (Tm), an ytterbium atom (Yb), and a lutetium atom (Lu).

Hereinafter, the hexagonal strontium ferrite powder which is one aspect of the hexagonal ferrite powder will be described in more detail.

The activation volume of the hexagonal strontium ferrite powder is preferably 800 to 1,600 $nm^3$. The atomized hexagonal strontium ferrite powder showing the activation volume in the range described above is suitable for manufacturing a magnetic tape exhibiting excellent electromagnetic conversion characteristics. The activation volume of the hexagonal strontium ferrite powder is preferably equal to or greater than 800 nm³ and can also be, for example equal to or greater than 850 nm³. In addition, from a viewpoint of further improving electromagnetic conversion characteristics, the activation volume of the hexagonal strontium ferrite powder is more preferably equal to or smaller than 1,500 nm³, even more preferably equal to or smaller than 1,400 nm³, still preferably equal to or smaller than 1,300 nm³, still more preferably equal to or smaller than 1,200 nm³, and still even more preferably equal to or smaller than 1,100 nm³. The same can be applied to the activation volume of the hexagonal barium ferrite powder.

The "activation volume" is a unit of magnetization reversal and an index showing a magnetic magnitude of the particles. Regarding the activation volume and an anisotropy constant Ku which will be described later disclosed in the invention and the specification, magnetic field sweep rates of a coercivity Hc measurement part at time points of 3 minutes and 30 minutes are measured by using a vibrating sample magnetometer (measurement temperature: 23° C. ±1° C.), and the activation volume and the anisotropy constant Ku are values acquired from the following relational expression of Hc and an activation volume V. A unit of the anisotropy constant Ku is 1 erg/cc=1.0×10⁻¹ J/m³.

$$Hc=2Ku/Ms\{1-[(kT/KuV)ln(At/0.693)]^{1/2}\}$$

[In the expression, Ku: anisotropy constant (unit: J/m³), Ms: saturation magnetization (unit: kA/m), k: Boltzmann's constant, T: absolute temperature (unit: K), V: activation volume (unit: cm³), A: spin precession frequency (unit: s⁻¹), and t: magnetic field reversal time (unit: s)]

The anisotropy constant Ku can be used as an index of reduction of thermal fluctuation, that is, improvement of thermal stability. The hexagonal strontium ferrite powder can preferably have Ku equal to or greater than 1.8×10⁵ J/m³, and more preferably have Ku equal to or greater than 2.0×10⁵ J/m³. In addition, Ku of the hexagonal strontium ferrite powder can be, for example, equal to or smaller than 2.5×10⁵ J/m³. However, the high Ku is preferable, because it means high thermal stability, and thus, Ku is not limited to the exemplified value.

The hexagonal strontium ferrite powder may or may not include rare earth atom. In a case where the hexagonal strontium ferrite powder includes rare earth atom, it preferably includes rare earth atom in a content (bulk content) of 0.5 to 5.0 atom %, with respect to 100 atom % of iron atom is 0.5 to 5.0 atom %. In one aspect, the hexagonal strontium ferrite powder which includes rare earth atom can have a rare earth atom surface portion uneven distribution. The "rare earth atom surface portion uneven distribution" of the invention and the specification means that a rare earth atom content with respect to 100 atom % of iron atom in a solution obtained by partially dissolving the hexagonal strontium ferrite powder with acid (referred to as a "rare earth atom surface portion content" or simply as a "surface portion content" for rare earth atom) and a rare earth atom content with respect to 100 atom % of iron atom in a solution obtained by totally dissolving the hexagonal strontium ferrite powder with acid (referred to as "rare earth atom bulk content" or simply as a "bulk content" for rare earth atom) satisfy a ratio of "rare earth atom surface portion content/ rare earth atom bulk content>1.0". The rare earth atom content of the hexagonal strontium ferrite powder is identical to the bulk content. With respect to this, the partial dissolving using acid is to dissolve the surface portion of particles configuring the hexagonal strontium ferrite powder, and accordingly, the rare earth atom content in the solution obtained by the partial dissolving is the rare earth atom content in the surface portion of the particles configuring the hexagonal strontium ferrite powder. The rare earth atom surface portion content satisfying a ratio of "rare earth atom surface portion content/rare earth atom bulk content>1.0" means that the rare earth atoms are unevenly distributed in the surface portion (that is, a larger amount of the rare earth atom is present, compared to that inside), in the particles configuring the hexagonal strontium ferrite powder. The surface portion of the specification and the specification means a part of the region of the particles configuring the hexagonal strontium ferrite powder from the inside from the surface.

In a case where the hexagonal strontium ferrite powder includes rare earth atom, the hexagonal strontium ferrite powder preferably includes rare earth atom having a content (bulk content) of 0.5 to 5.0 atom % with respect to 100 atom % of an iron atom. It is surmised that the rare earth atom having the bulk content in the range described above and uneven distribution of the rare earth atom in the surface portion of the particles configuring the hexagonal strontium ferrite powder contribute to prevention of a decrease in reproducing output during repeated reproducing. This is surmised that it is because the anisotropy constant Ku can be increased due to the rare earth atom having the bulk content in the range described above included in the hexagonal strontium ferrite powder and the uneven distribution of the rare earth atom in the surface portion of the particles configuring the hexagonal strontium ferrite powder. As the value of the anisotropy constant Ku is high, occurrence of a phenomenon which is so-called thermal fluctuation can be prevented (that is, thermal stability can be improved). By preventing occurrence of thermal fluctuation, a decrease in reproducing output during repeated reproducing can be prevented. This is surmised that, the uneven distribution of the rare earth atom in the surface portion of the particles of the hexagonal strontium ferrite powder may contribute to stabilization of a spin at an iron (Fe) site in a crystal lattice of the surface portion, thereby increasing the anisotropy constant Ku.

In addition, it is also surmised that, by using the hexagonal strontium ferrite powder having a rare earth atom surface portion uneven distribution as magnetic powder of the magnetic layer, chipping of the surface of the magnetic layer due to sliding with a magnetic head can be prevented. That is, it is surmised that the hexagonal strontium ferrite powder having a rare earth atom surface portion uneven distribution also contributes to improvement of running durability of a magnetic recording medium. It is surmised that, this is because the uneven distribution of the rare earth atom in the surface of the particles configuring the hexagonal strontium ferrite powder contributes to an interaction between the surface of the particles and an organic substance (for example, binding agent and/or additive) included in the magnetic layer, thereby improving hardness of the magnetic layer.

From a viewpoint of further preventing a decrease in reproducing output during repeated running and/or a viewpoint of further improving running durability, the rare earth atom content (bulk content) is preferably 0.5 to 4.5 atom %, more preferably 1.0 to 4.5 atom %, and even more preferably 1.5 to 4.5 atom %.

The bulk content is a content obtained by totally dissolving the hexagonal strontium ferrite powder. In the invention and the specification, the content of the atom is a bulk content obtained by totally dissolving the hexagonal strontium ferrite powder, unless otherwise noted. The hexagonal strontium ferrite powder which includes rare earth atom may include only one kind of rare earth atom or may include two or more kinds of rare earth atom, as the rare earth atom. In a case where two or more kinds of rare earth atom are included, the bulk content is obtained from the total of the two or more kinds of rare earth atom. The same also applies to the other components of the invention and the specification. That is, for a given component, only one kind may be used or two or more kinds may be used, unless otherwise noted. In a case where two or more kinds are used, the content is a content of the total of the two or more kinds.

In a case where the hexagonal strontium ferrite powder includes rare earth atom, the rare earth atom included therein may be any one or more kinds of the rare earth atom. Examples of the rare earth atom preferable from a viewpoint of further preventing a decrease in reproducing output during repeated reproducing include a neodymium atom, a samarium atom, an yttrium atom, and a dysprosium atom, a neodymium atom, a samarium atom, an yttrium atom are more preferable, and a neodymium atom is even more preferable.

In the hexagonal strontium ferrite powder having a rare earth atom surface portion uneven distribution, a degree of uneven distribution of the rare earth atom is not limited, as long as the rare earth atom is unevenly distributed in the surface portion of the particles configuring the hexagonal strontium ferrite powder. For example, regarding the hexagonal strontium ferrite powder, a ratio of the surface portion content of the rare earth atom obtained by partial dissolving performed under the dissolving conditions exemplified below and the bulk content of the rare earth atom obtained by total dissolving performed under the dissolving conditions exemplified below, "surface portion content/bulk content" is greater than 1.0 and can be equal to or greater than 1.5. The surface portion content satisfying a ratio of "surface portion content/bulk content >1.0" means that the rare earth atoms are unevenly distributed in the surface portion (that is, a larger amount of the rare earth atoms is present, compared to that inside), in the particles configuring the hexagonal strontium ferrite powder. In addition, the ratio of the surface portion content of the rare earth atom obtained by partial dissolving performed under the dissolving conditions exemplified below and the bulk content of the rare earth atom obtained by total dissolving performed under the dissolving conditions exemplified below, "surface portion content/bulk content" can be, for example, equal to or smaller than 10.0, equal to or smaller than 9.0, equal to or smaller than 8.0, equal to or smaller than 7.0, equal to or smaller than 6.0, equal to or smaller than 5.0, or equal to or smaller than 4.0. However, the "surface portion content/bulk content" is not limited to the exemplified upper limit or the lower limit, as long as the rare earth atom is unevenly distributed in the surface portion of the particles configuring the hexagonal strontium ferrite powder.

The partial dissolving and the total dissolving of the hexagonal strontium ferrite powder will be described below. Regarding the hexagonal strontium ferrite powder present as the powder, sample powder for the partial dissolving and the total dissolving are collected from powder of the same batch. Meanwhile, regarding the hexagonal strontium ferrite powder included in a magnetic layer of a magnetic recording medium, a part of the hexagonal strontium ferrite powder extracted from the magnetic layer is subjected to the partial dissolving and the other part is subjected to the total dissolving. The extraction of the hexagonal strontium ferrite powder from the magnetic layer can be performed by a method disclosed in a paragraph 0032 of JP2015-91747A.

The partial dissolving means dissolving performed so that the hexagonal strontium ferrite powder remaining in the solution can be visually confirmed at the time of the completion of the dissolving. For example, by performing the partial dissolving, a region of the particles configuring the hexagonal strontium ferrite powder which is 10% to 20% by mass with respect to 100% by mass of a total of the particles can be dissolved. On the other hand, the total dissolving means dissolving performed until the hexagonal strontium ferrite powder remaining in the solution is not visually confirmed at the time of the completion of the dissolving.

The partial dissolving and the measurement of the surface portion content are, for example, performed by the following method. However, dissolving conditions such as the amount of sample powder and the like described below are merely examples, and dissolving conditions capable of performing the partial dissolving and the total dissolving can be randomly used.

A vessel (for example, beaker) containing 12 mg of sample powder and 10 ml of hydrochloric acid having a concentration of 1 mol/L is held on a hot plate at a set temperature of 70° C. for 1 hour. The obtained solution is filtered with a membrane filter having a hole diameter of 0.1 µm. The element analysis of the solution obtained as described above is performed by an inductively coupled plasma (ICP) analysis device. By doing so, the surface portion content of the rare earth atom with respect to 100 atom % of the iron atom can be obtained. In a case where a plurality of kinds of rare earth atoms are detected from the element analysis, a total content of the entirety of the rare earth atoms is the surface portion content. The same applies to the measurement of the bulk content.

Meanwhile, the total dissolving and the measurement of the bulk content are, for example, performed by the following method.

A vessel (for example, beaker) containing 12 mg of sample powder and 10 ml of hydrochloric acid having a concentration of 4 mol/L is held on a hot plate at a set temperature of 80° C. for 3 hours. After that, the process is performed in the same manner as in the partial dissolving and the measurement of the surface portion content, and the bulk content with respect to 100 atom % of the iron atom can be obtained.

From a viewpoint of increasing reproducing output in a case of reproducing information recorded on a magnetic recording medium, it is desirable that the mass magnetization $\sigma s$ of magnetic powder included in the magnetic recording medium is high. In regards to this point, in hexagonal strontium ferrite powder which includes the rare earth atom but does not have the rare earth atom surface portion uneven distribution, $\sigma s$ tends to significantly decrease, compared to that in hexagonal strontium ferrite powder not including the rare earth atom. With respect to this, it is surmised that, hexagonal strontium ferrite powder having the rare earth atom surface portion uneven distribution is preferable for preventing such a significant decrease in $\sigma s$. In one aspect, $\sigma s$ of the hexagonal strontium ferrite powder can be equal to or greater than 45 A·m²/kg and can also be equal to or greater than 47 A·m²/kg. On the other hand, from a viewpoint of noise reduction, $\sigma s$ is preferably equal to or smaller than 80 A·m²/kg and more preferably equal to or smaller than 60 A·m²/kg. $\sigma s$ can be measured by using a known measurement device capable of measuring magnetic properties such as a vibrating sample magnetometer. Unless stated otherwise, the mass magnetization $\sigma s$ is a value measured at a magnetic field strength of 15 kOe. With regard to the unit of $\sigma s$, $1[kOe]=10^6/4\pi[A/m]$ With regard to the contents (bulk contents) of the constituting atoms of the hexagonal strontium ferrite powder, the content of the strontium atom in the hexagonal strontium ferrite powder can be, for example, 2.0 to 15.0 atom % with respect to 100 atom % of the iron atom. In one aspect, in the hexagonal strontium ferrite powder, the divalent metal atom included in this powder can be only a strontium atom. In another aspect, the hexagonal strontium ferrite powder can also include one or more kinds of other divalent metal atoms, in addition to the strontium atom. For example, a barium atom and/or a calcium atom can be included. In a case where the divalent metal atom other than the strontium atom is included, a content of a barium atom and a content of a calcium atom in the hexagonal strontium ferrite powder respectively can be, for example, 0.05 to 5.0 atom % with respect to 100 atom % of the iron atom.

As the crystal structure of the hexagonal ferrite, a magnetoplumbite type (also referred to as an "M type"), a W type, a Y type, and a Z type are known. The hexagonal strontium ferrite powder may have any crystal structure. The crystal structure can be confirmed by X-ray diffraction analysis. In the hexagonal strontium ferrite powder, a single crystal structure or two or more kinds of crystal structure can be detected by the X-ray diffraction analysis. For example, in one aspect, in the hexagonal strontium ferrite powder, only the M type crystal structure can be detected by the X-ray diffraction analysis. For example, the M type hexagonal ferrite is represented by a compositional formula of $AFe_{12}O_{19}$. Here, A represents a divalent metal atom, in a case where the hexagonal strontium ferrite powder has the M type, A is only a strontium atom (Sr), or in a case where a plurality of divalent metal atoms are included as A, the strontium atom (Sr) occupies the hexagonal strontium ferrite powder with the greatest content based on atom % as described above. A content of the divalent metal atom in the hexagonal strontium ferrite powder is generally determined according to the type of the crystal structure of the hexagonal ferrite and is not particularly limited. The same applies to a content of an iron atom and a content of an oxygen atom. The hexagonal strontium ferrite powder at least includes an iron atom, a strontium atom, an oxygen atom, may include a rare earth atom, and may or may not include atoms other than these atoms. As an example, the hexagonal strontium ferrite powder may include an aluminum atom (Al). A content of the aluminum atom can be, for example, 0.5 to 10.0 atom % with respect to 100 atom % of the iron atom. From a viewpoint of further preventing a decrease in reproducing output during repeated reproducing, the hexagonal strontium ferrite powder includes the iron atom, the strontium atom, the oxygen atom, and the rare earth atom, and a content of the atoms other than these atoms is preferably equal to or smaller than 10.0 atom %, more preferably 0 to 5.0 atom %, and may be 0 atom % with respect to 100 atom % of the iron atom. That is, in one aspect, the hexagonal strontium ferrite powder may not include atoms other than the iron atom, the strontium atom, the oxygen atom, and the rare earth atom. The content shown with atom % described above is obtained by converting the content (unit: % by mass) of each atom obtained by totally dissolving the hexagonal strontium ferrite powder by using the atomic weight. In addition, in the invention and the specification, a given atom which is "not included" means that the content thereof obtained by performing total dissolving and measurement by using an ICP analysis device is 0% by mass. A detection limit of the ICP analysis device is generally equal to or smaller than 0.01 ppm (parts per million) based on mass. The expression "not included" is used as a meaning including that a given atom is included with the amount smaller than the detection limit of the ICP analysis device. In one aspect, the hexagonal strontium ferrite powder does not include a bismuth atom (Bi).

It is possible to use conventionally-known binders as the binder contained in the magnetic layer 13. Among these, a binder similar to the binder for use in the non-magnetic layer 12 is preferable in light of the dispersibility of the magnetic powder and the rigidity of the magnetic layer 13. The content of the binder in the magnetic layer 13 is preferably 7 to 50 parts by mass, and more preferably 10 to 35 parts by mass with respect to 100 parts by mass of the magnetic powder. In particular, when using a vinyl chloride resin and a polyurethane resin in combination, it is preferable to use 5 to 30 parts by mass of vinyl chloride resin and 2 to 20 parts by mass of polyurethane resin. Further, as in the case of the non-magnetic layer 12, in order to crosslink the binder to enhance the strength of the magnetic layer 13, it is preferable to use a crosslinking agent such as polyisocyanate. The content of the crosslinking agent is preferably 10 to 50 parts by mass with respect to 100 parts by mass of the binder.

The magnetic layer 13 may further contain known additives such as a polishing agent, a lubricant and a dispersing agent, as long as it contains the magnetic powder and the binder, which are described above. In particular, a polishing agent and a lubricant are preferably used in light of the transport durability.

Specific examples of the polishing agent include α-alumina, β-alumina, silicon carbide, chromium oxide, ceric oxide, α-iron oxide, corundum, synthetic diamond, silicon nitride, silicon carbide, titanium carbide, titanium oxide, silicon dioxide, and boron nitride, and among these, a polishing agent having a Mohs' hardness of 6 or more is more preferable. These polishing agents may be used alone or in combination of two or more. The average particle size of the polishing agent is preferably 10 to 200 nm although it depends on the type of polishing agent used. The content of the polishing agent is preferably 5 to 20 parts by mass, and more preferably 8 to 18 parts by mass with respect to 100 parts by mass of the magnetic powder.

With regard to the lubricant, it is possible to use a lubricant similar to the lubricant for use in the non-magnetic layer 12. Among these, it is preferable to use a fatty acid ester and a fatty acid amide in combination. When containing a lubricant in the magnetic layer 13, it is preferable to use 0.2 to 3 parts by mass of fatty acid ester and 0.5 to 5 parts by mass of fatty acid amide with respect to the total amount, which is taken as 100 parts by mass, of all the powders, such as the magnetic powder and the polishing agent, in the magnetic layer 13. The reason for this is as follows. A fatty acid ester content of less than 0.2 parts by mass will result in a decreased effect of reducing the coefficient of friction, and a fatty acid ester content of more than 3.0 parts by mass will lead to a risk of an adverse effect such as sticking of the magnetic layer 13 to the head. A fatty acid amide content of less than 0.5 parts by mass will result in a decreased effect of preventing seizing, which occurs due to mutual contact between the magnetic head and the magnetic layer 13, and a fatty acid amide content of more than 5 parts by mass will lead to a risk of bleeding of the fatty acid amide. When containing fatty acid in the magnetic layer 13 as the lubricant, it is preferable to use 0.5 to 4 parts by mass of fatty acid with respect to the total amount, which is taken as 100 parts by mass, of all the powders, such as the magnetic powder and the polishing agent, in the magnetic layer 13. It should be noted that the lubricant contained in the magnetic layer 13 and the lubricant contained in the non-magnetic layer 12 are mutually migratable.

With regard to the dispersing agent, it is possible to use the same dispersing agent as that for use in the non-magnetic layer 12. The content of the dispersing agent is generally in a range of 0.5 to 10 parts by mass with respect to 100 parts by mass of the magnetic powder.

Further, the magnetic layer 13 may contain a conventionally-known carbon black for the purpose of improving the conductivity and the surface lubricity, if necessary. Specific examples of such a carbon black include acetylene black, furnace black, and thermal black. The carbon black preferably has an average particle size of 0.01 to 0.1 μm. An average particle size of 0.01 μm or more will allow for formation of the magnetic layer 13 in which the carbon black is well dispersed. On the other hand, an average particle size of 0.1 μm or less will allow for formation of the magnetic layer 13 that has excellent surface smoothness. Moreover, two or more types of carbon blacks having different average particle sizes may be used, if necessary. The content of the carbon black is preferably 0.2 to 5 parts by mass, and more preferably 0.5 to 4 parts by mass with respect to 100 parts by mass of the magnetic powder.

For the purpose of improving the short-wavelength recording characteristics, the magnetic layer 13 preferably has a thickness of 10 to 150 nm, more preferably 20 to 100 nm, and even more preferably 30 to 70 nm. As long as the magnetic layer 13 has the aforementioned thickness, thickness loss during recording/reproduction due to the self-demagnetization effect can be reduced even in the case of short-wavelength recording. Thus, it is possible to achieve a high output even in a system whose shortest recording wavelength is 0.3 μm or less. The magnetic layer 13 having such a small thickness in particular cannot contain a large amount of the lubricant. For this reason, the magnetic recording medium (magnetic tape) of the present invention is suitable for improving the transport characteristics.

Mr·t, which is a product of Mr as the residual magnetic flux density of the magnetic layer 13 in the longitudinal direction and t as the average thickness of the magnetic layer 13, is 0.0020 to 0.0150 μT·m, more preferably 0.0040 to 0.0125 μT·m, and even more preferably 0.0040 to 0.0100 μT·m. The recording density improves as Mr·t becomes smaller. However, in the case where an MR head is used as a reproduction head, a reproduced output tends to decline when Mr·t is too small. On the other hand, in the case where Mr·t is too large, the MR head is saturated, whereby a reproduced output tends to be distorted.

The "surface roughness" of the magnetic layer 13 refers to Ra as centerline average roughness defined in the Japanese Industrial Standard (JIS) B0601, and it is preferable that Ra as the centerline average roughness is less than 2.0 nm. The more the surface smoothness of the magnetic layer 13 improves, the higher the output that can be obtained, but an excessively smoothed surface of the magnetic layer 13 will lead to an increase in the coefficient of friction, which in turn decreases the transport stability. Therefore, Ra is preferably 1.0 nm or more.

Methods of forming the magnetic layer 13 are not particularly limited. The magnetic layer 13 may be formed by dispersing the components for forming the magnetic layer such as the magnetic powder and the lubricant as described above in a solvent to prepare a magnetic paint, applying the magnetic paint on the principal surface of the non-magnetic layer 12 described above, and king the applied paint. For example, tetrahydrofuran, cyclohexanone, methylethylketone, toluene or the like can be used as the solvent.

Non-Magnetic Substrate

A conventionally used non-magnetic substrate for magnetic recording media can be used as the non-magnetic substrate 11. Specific examples of the non-magnetic substrate include plastic films composed of polyesters such as polyethylene terephthalate and polyethylene naphthalate, polyolefins, cellulose triacetate, polycarbonate, polyamide, polyimide, polyamide imide, polysulfone, and aramid.

The thickness of the non-magnetic substrate 11, which varies depending on the application, is preferably 1.5 to 11 μm and more preferably 2 to 7 μm. When the non-magnetic substrate 11 has a thickness of 1.5 μm or more, the film forming properties are improved, and a high strength can be achieved. On the other hand, when the non-magnetic substrate 11 has a thickness of 11 μm or less, an unnecessary increase in the overall thickness will be avoided, and, for example, in the case of a magnetic tape, the recording capacity per reel can be increased.

The Young's modulus of the non-magnetic substrate 11 in the longitudinal direction is preferably 5.8 GPa or more, and more preferably 7.1 GPa or more. When the Young's modulus of the non-magnetic substrate 11 in the longitudinal direction is 5.8 GPa or more, the transport characteristics can be improved. Moreover, in the case of a magnetic recording medium for use in a helical scanning system, the ratio (MD/TD) of the Young's modulus (MD) in the longitudinal direction to the Young's modulus (TD) in the width direction is preferably within a range of 0.6 to 0.8, more preferably within a range of 0.65 to 0.75, and even more preferably 0.7. As long as this ratio falls within the above-described range, variations in the output of the magnetic head between an entrance side and an exit side of a track (flatness) can be suppressed. In the case of a magnetic recording medium for use in a linear recording system, the ratio (MD/TD) of the Young's modulus (MD) in the longitudinal direction to the Young's modulus (TD) in the width direction is preferably within a range of 0.7 to 1.3.

The temperature coefficient of expansion of the non-magnetic substrate 11 in the width direction is preferably 0 to $10 \times 10^{-6}$, and the humidity coefficient of expansion in the width direction is preferably 0 to $10 \times 10^{-6}$. As long as these coefficients fall within the above-described ranges, off-track errors due to a change in the temperature or humidity can be suppressed, so that the error rate can be reduced.

Backcoat Layer

For the purpose of improving the transport characteristics and the like, it is preferable that the backcoat layer 14 is provided on the principal surface (here, on the lower surface) of the non-magnetic substrate 11 opposite to the one on which the non-magnetic layer 12 is formed. The backcoat layer 14 preferably has a thickness of 0.2 to 0.8 μm and more preferably 0.3 to 0.8 μm. The reason for this is as follows. An excessively small thickness of the backcoat layer 14 will result in an insufficient effect of improving the transport characteristics, and an excessively large thickness will lead to an increase in the overall thickness of the magnetic tape, which in turn result in a decrease in the recording capacity per reel of magnetic tape.

The backcoat layer 14 preferably contains a carbon black including, for example, acetylene black, furnace black, or thermal black. Generally, a small particle size carbon black and a large particle size carbon black, which are relatively different in particle size, are used in combination. This is because the combined use will increase the effect of improving the transport characteristics.

Moreover, the backcoat layer 14 contains a binder. Binders are not particularly limited and binders similar to those for use in the non-magnetic layer 12 and the magnetic layer 13 can be used. Among these, it is preferable to use a cellulose resin and a polyurethane resin in combination in order to reduce the coefficient of friction and improve the transport characteristics with respect to the magnetic head.

For the purpose of improving the strength, it is preferable that the backcoat layer 14 further contains iron oxide, alumina, or the like. Methods for forming the backcoat layer are not particularly limited. The backcoat layer may be formed by dispersing the components for forming the backcoat layer in a solvent to prepare a backcoat layer paint, applying the backcoat layer paint on the principal surface of the non-magnetic substrate 11 opposite to the one on which the non-magnetic layer 12 is formed, and king the applied paint. The backcoat layer 14 may be formed before or after the formation of the non-magnetic layer 12 and the magnetic layer 13.

Topcoat Layer

Although not being illustrated, a topcoat layer may also be formed by applying the above-described lubricant further onto the surface of the magnetic layer 13 shown in FIG. 2. This further improves the transport characteristics and durability of the magnetic tape.

Hereinafter, the present invention will be described more specifically by means of examples. However, the present invention is not limited to the examples below. It should be noted that in the following description, "part" means "part by mass".

In the magnetic tape, a servo pattern may be formed by a known method, in order to allow control of tracking of a magnetic head and control of the running speed of the magnetic tape to be performed in the magnetic recording and reproducing device. The "formation of a servo pattern" can also be referred to as "recording of a servo signal". Formation of the servo pattern in a magnetic tape will be described below, as an example.

The servo pattern is generally recorded along the longitudinal direction of the magnetic tape. Examples of control (servo control) systems utilizing servo signals include timing-based servo (TBS), amplitude servo, and frequency servo.

As shown in European Computer Manufacturers Association (ECMA)-319, a timing-based servo technique has been employed in a magnetic tape (generally referred to as "LTO tape") in accordance with Linear Tape-Open (LTO) specifications. In this timing-based servo technique, the servo patterns are configured of consecutive alignment of a plurality of pairs of magnetic stripes (also referred to as "servo stripes"), in each pair of which magnetic stripes are not parallel with each other, in the longitudinal direction of the magnetic tape. The reason why the servo signal is configured of pairs of magnetic stripes, in each pair of which magnetic stripes are not parallel with each other, is to teach a passing position to a servo signal reading element passing over the servo pattern. Specifically, the pairs of magnetic stripes are formed so that the intervals consecutively change along the width direction of the magnetic tape, and relative positions of the servo pattern and the servo signal reading element can be determined by reading the intervals with the servo signal reading element. The information on this relative positions enable the data track to be tracked. Thus, a plurality of servo tracks are generally set over the servo signal along the width direction of the magnetic tape.

The servo band is configured of servo signals continuously aligned in the longitudinal direction of the magnetic tape. A plurality of the servo bands are generally provided in the magnetic tape. For example, in an LTO tape, the number of servo bands is five. A region sandwiched between the adjacent two servo bands is referred to as a data band. The data band is configured of a plurality of data tracks, and data tracks corresponds to respective servo tracks.

In one aspect, information on the number of servo bands (also referred to as information on a "servo band identification (ID)" or a "unique data band identification method (UDIM)") is embedded in each servo band as shown in Japanese Patent Application Publication No. 2004-318983. This servo band ID is recorded shiftedly such that the position of a specific pair of servo stripes, among a plurality of servo stripes present in a servo band, should shift in the longitudinal direction of the magnetic tape. Specifically, the degree of shifting the specific pair of servo stripes among the plurality of pairs of servo stripes is changed by each servo band. Accordingly, the recorded servo band ID is unique by each servo band, and the servo band is uniquely specified by reading one servo band with the servo signal reading element.

As another method for uniquely specifying a servo band, a method using a staggered technique as shown in ECMA-319 can be applied. In this staggered technique, a group of a plurality of pairs of magnetic stripes (servo stripes), in each pair of which magnetic stripes are not parallel with each other and which are placed consecutively in the longitudinal direction of the magnetic tape, are shiftedly recorded by each servo band in the longitudinal direction of the magnetic tape. A combination of ways of shifting for each adjacent servo bands is unique in the entire magnetic tape. Accordingly, when a servo pattern is read with two servo signal reading elements, the servo band can be uniquely specified.

Information indicating a position in the longitudinal direction of the magnetic tape (also referred to as "longitudinal position (LPOS) information") is also generally embedded in each servo band as shown in ECMA-319. This LPOS information is also recorded by shifting the position of the pair of servo stripes in the longitudinal direction of the magnetic tape. Unlike the UDIM information, the same signal is recorded in each servo band in the case of LPOS information.

Other information different from UDIM information and LPOS information as mentioned above can also be embedded in the servo band. In this case, the information to be embedded may be different by each servo band like the UDIM information or may be the same by each servo band like the LPOS information.

As a method for embedding information in a servo band, a method other than the above-described method may also be employed. For example, among a group of pairs of servo stripes, a predetermined pair of servo stripes is thinned out to record a predetermined code.

A head for forming a servo pattern is referred to as a servo write head. The servo write head has the same number of pairs of gaps corresponding to the respective pairs of magnetic stripes as the number of servo bands. Generally, a core and a coil are connected to each pair of gaps, and a magnetic field generated in the core by suppling a current pulse to the coil can generate a leakage magnetic field to the pair of gaps. When a servo pattern is formed, a magnetic pattern corresponding to a pair of gaps can be transferred to the magnetic tape by inputting a current pulse while causing a magnetic tape to run over the servo write head, to form a servo pattern. Thus, the servo pattern can be formed. The width of each gap can be set as appropriate according to the density of the servo pattern to be formed. The width of each gap can be set to, for example, 1 µm or less, 1 to 10 µm, or 10 µm or larger.

Before forming a servo pattern on the magnetic tape, the magnetic tape is generally subjected to a demagnetization (erasing) treatment. This erasing treatment may be performed by adding a uniform magnetic field to the magnetic tape using a direct current magnet or an alternate current magnet. The erasing treatment includes direct current (DC) erasing and an alternating current (AC) erasing. The AC erasing is performed by gradually reducing the intensity of the magnetic field while inverting the direction of the magnetic field applied to the magnetic tape. In contrast, the DC erasing is performed by adding a one-direction magnetic field to the magnetic tape. The DC erasing further includes two methods. The first method is horizontal DC erasing of applying a one-direction magnetic field along the longitudinal direction of the magnetic field. The second method is a vertical DC erasing of applying a one-direction magnetic field along the thickness direction of the magnetic tape. The erasing treatment may be applied to the entire magnetic tape of the magnetic tape, or may be applied to each servo band of the magnetic tape.

The direction of the magnetic field of the servo pattern to be formed is determined according to the direction of the erasing. For example, when the magnetic tape has been subjected to the horizontal DC erasing, the servo pattern is formed so that the direction of the magnetic field becomes reverse to the direction of the erasing. Accordingly, the output of the servo signal, which can be yielded by reading the servo pattern, can be increased. As shown in Japanese Patent Application Publication No. 2012-53940, when a magnetic pattern is transferred to the magnetic tape which has been subjected to the vertical DC erasing using the gaps, the servo signal, which has been yielded by reading the servo pattern thus formed, has a unipolar pulse shape. In contrast, when a magnetic pattern is transferred to the magnetic tape which has been subjected to the parallel DC erasing, the servo signal, which has been yielded by reading the servo pattern thus formed, has a bipolar pulse shape.

Magnetic Recording and Reproducing Device

One aspect of the invention relates to a magnetic recording and reproducing device including the above magnetic recording medium and a magnetic head.

In the invention and the specification, the "magnetic recording and reproducing device" means a device capable of performing at least one of the recording of data on the magnetic recording medium or the reproducing of data recorded on the magnetic recording medium. Such a device is generally called a drive. The magnetic recording and reproducing device can be a sliding type magnetic recording and reproducing device. The sliding type device is a device in which the surface of the magnetic layer and the magnetic head are in contact with each other and slide, in a case of performing recording of data on the magnetic recording medium and/or reproducing of the recorded data.

The magnetic head included in the magnetic recording and reproducing device may be a recording head capable of recording data on a magnetic recording medium, and can also be a reproducing head capable of reproducing data recorded on the magnetic recording medium. In addition, in one aspect, the magnetic recording and reproducing device can include both of a recording head and a reproducing head as separate magnetic heads. In another aspect, the magnetic head included in the magnetic recording and reproducing device can has a configuration where both of an element for recording data (recording element) and an element for reproducing data (reproducing element) are included in one magnetic head. Hereinafter, an element for recording data and an element for reproducing data are collectively referred to as "(an) element(s) for data". As the reproducing head, a magnetic head (MR head) including, as the reproducing element, a magnetoresistive (MR) element capable of reading data recorded on the magnetic recording medium with excellent sensitivity is preferable. As the MR head, various known MR heads such as an anisotropic magnetoresistive (AMR) head, a giant magnetoresistive (GMR) head, and a tunnel magnetoresistive (TMR) head may be used. In addition, the magnetic head which records data and/or reproduces data may include a servo pattern reading element. Alternatively, as a head other than the magnetic head which records data and/or reproduces data, a magnetic head (servo head) including a servo signal reading element may be included in the magnetic recording and reproducing device. For example, the magnetic head (hereinafter, also referred to as "recording and reproducing head") which records data and/or reproduces data may include two servo signal reading elements, and each of the two servo signal reading elements can read adjacent two servo bands at the same time. One or a plurality of data elements may be disposed between two servo signal reading elements.

In the magnetic recording and reproducing device, the recording of data on the magnetic recording medium and the reproducing of data recorded on the magnetic recording medium can be performed by bringing the surface of the magnetic layer of the magnetic recording medium into contact with the magnetic head and sliding. The magnetic recording and reproducing device may include the magnetic recording medium according to one aspect of the invention, and well-known technologies can be applied for the other configurations.

For example, when recording and/or reproducing data, a tracking using a servo signal, which has been yielded by reading a servo pattern, is firstly performed. That is, an element for data is controlled to pass over data track of interest by causing a servo signal reading element to follow a predetemined data track. The movement of the data track is performed by shifting the servo track read by the servo signal reading element in the width direction of a tape.

The recording and reproducing head can record on and/or reproduce from other data bands. At that time, the servo signal reading element may be moved to a predetermined servo band utilizing the above-described UDIM information, and tracking of the servo band may be started.

EXAMPLES

Example 1

Preparation of Non-Magnetic Paint

A kneaded product was prepared by kneading non-magnetic paint components (1) listed in Table 1 using a batch-type kneader. The obtained kneaded product and non-magnetic paint components (2) listed in Table 2 were stirred with a stirrer to prepare a mixed solution. The obtained mixed solution was dispersed using a sand mill (residence time: 60 minutes) filled with zirconia beads (specific gravity: 6, particle size: 0.1 mm) to prepare a dispersion, and afterward, the obtained dispersion and non-magnetic paint components (3) listed in Table 3 were stirred with the stirrer, and the resulting solution was filtered through a filter to prepare a non-magnetic paint. Then, the non-magnetic paint was passed through a collision chamber twice with an orifice diameter of 0.2 mm and a pressuring condition of 150 MPa using a collision type disperser to redisperse the non-magnetic paint, thus obtaining the non-magnetic paint.

TABLE 1

| Non-magnetic paint components (1) | Part |
|---|---|
| Needle-like iron oxide (average particle size: 110 nm) | 68 |
| Carbon black (average particle size: 17 nm) | 20 |
| Granular alumina powder (average particle size: 120 nm) | 12 |
| Methyl acid phosphate | 1 |
| Vinyl chloride-hydroxypropyl acrylate copolymer (—$SO_3Na$ group content: $0.7 \times 10^{-4}$ equivalent/g) | 9 |
| Polyester polyurethane resin (glass-transition temperature: 40° C., —$SO_3Na$ group content: $1 \times 10^{-4}$ equivalent/g) | 5 |
| Tetrahydrofuran | 13 |
| Cyclohexanone | 63 |
| Methyl ethyl ketone | 137 |

TABLE 2

| Non-magnetic paint components (2) | Part |
|---|---|
| Stearic acid | 1 |
| Butyl stearate | 1.5 |
| Cyclohexanone | 50 |
| Methyl ethyl ketone | 50 |

TABLE 3

| Non-magnetic paint components (3) | Part |
|---|---|
| Polyisocyanate | 2.5 |
| Cyclohexanone | 9 |
| Toluene | 9 |

Preparation of Magnetic Paint

A kneaded product was prepared by kneading magnetic paint components (1) listed in Table 4 and magnetic paint components (2) listed in Table 5 using the batch-type kneader. To the obtained kneaded product, magnetic paint components (3) listed in Table 6 were added in two steps to dilute the kneaded product, thus a slurry was prepared. The slurry was dispersed using the sand mill (residence time: 45 minutes) filled with zirconia beads (specific gravity: 6, particle size: 0.1 mm) to prepare a dispersion, and then the obtained dispersion and magnetic paint components (4) listed in Table 7 were stirred with the stirrer, and the resulting solution was filtered through a filter to prepare a magnetic paint.

TABLE 4

| Magnetic paint components (1) | Part |
|---|---|
| Ferromagnetic metallic iron magnetic powder (Fe) (additional elements: Co, Al, and Y) [Co/Fe: 24 at %, Al/(Fe + Co): 9.2 at %, Y/(Fe + Co): 11.8 at %, σs: 95 A·$m^2$/kg, Hc: 188 kA/m, average particle size: 35 nm, axial ratio: 3.8] | 100 |
| Polyester polyurethane resin (—$SO_3Na$ group content: $1 \times 10^{-4}$ equivalent/g) | 2 |
| Granular alumina powder (average particle size: 80 nm) | 10 |
| Phenylphosphonic acid | 4 |
| Tetrahydrofuran | 271 |

TABLE 5

| Magnetic paint components (2) | Part |
|---|---|
| Vinyl chloride-hydroxypropyl acrylate copolymer (—$SO_3Na$ group content: $0.7 \times 10^{-4}$ equivalent/g) | 17 |
| Polyester polyurethane resin (glass-transition temperature: 40° C., —$SO_3Na$ group content: $1 \times 10^{-4}$ equivalent/g) | 4 |
| Methyl ethyl ketone | 5 |
| Cyclohexanone | 7 |
| Toluene | 5 |

TABLE 6

| Magnetic paint components (3) | Part |
|---|---|
| Palmitic acid amide | 4 |
| Cyclohexanone | 175 |
| Methyl ethyl ketone | 175 |

TABLE 7

| Magnetic paint components (4) | Part |
|---|---|
| Polyisocyanate | 1.5 |
| Cyclohexanone | 14.5 |
| Methyl ethyl ketone | 14.5 |

Preparation of Backcoat Layer Paint

A mixed solution in which backcoat layer paint components listed in Table 8 were mixed was dispersed using the sand mill (residence time: 45 minutes) filled with zirconia beads (specific gravity: 6, particle size: 0.1 mm). Then, 15 parts of polyisocyanate was added to the obtained dispersion and stirred, and the resulting solution was filtered through a filter to prepare a backcoat layer paint.

TABLE 8

| Backcoat layer paint components | Part |
|---|---|
| Carbon black (average particle size: 25 nm) | 87 |
| Carbon black (average particle size: 300 nm) | 10 |
| Granular alumina powder (average particle size: 80 nm) | 3 |
| Nitrocellulose | 45 |
| Polyurethane resin (containing —$SO_3Na$ group) | 30 |
| Cyclohexanone | 260 |
| Toluene | 260 |
| Methyl ethyl ketone | 525 |

Production of Magnetic Tape for Evaluation

The above-described non-magnetic paint and magnetic paint were applied to one principal surface (the upper surface) of a non-magnetic substrate (a polyethylene naphthalate film, thickness: 5.0 μm) with an extrusion coater by simultaneous multilayer coating in such a manner that the non-magnetic paint and the magnetic paint after being dried and subjected to calendering would have a thickness of 1.0 μm and 50 nm, respectively, and thus a non-magnetic layer and a magnetic layer were formed in this order. It should be noted that at this time, a process for providing in-plane orientation was performed while applying an orientation magnetic field (400 kA/m) using a solenoid magnet.

Next, the above-described backcoat layer paint was applied to the principal surface (the lower surface) of the non-magnetic substrate opposite to the principal surface (the upper surface) on which the non-magnetic layer and the magnetic layer were formed, in such a manner that the backcoat layer paint would have a thickness of 0.5 μm after being dried and subjected to calendering, and then the paint was dried to form a backcoat layer. The resulting raw fabric roll with the non-magnetic layer and the magnetic layer formed on the upper surface side of the non-magnetic substrate and the backcoat layer on the lower surface side was subjected to calendering using a calender having seven stages of metal rollers at a temperature of 100° C. and a line pressure of 296 kN/m.

The resulting raw fabric roll was cured at 70° C. for 72 hours to produce a magnetic sheet. This magnetic sheet was cut into pieces of a width of ½ inches, and a servo signal conforming to the LTO standards was written. Then, the magnetic layer was subjected to polishing using a rotating polishing wheel (material: stainless steel (SUS304), diameter: 30 mm, 36 grooves (width, depth: 0.5 mm) being formed at a 45° angle relative to the circumferential direction), thus a magnetic tape for evaluation was produced.

Example 2

A magnetic tape for evaluation was produced in the same manner as in Example 1 except that the thickness of the magnetic layer after being dried and subjected to calendering was changed to 60 nm, the collision type disperser was not used during the preparation of the non-magnetic paint, the calendering conditions were changed to a temperature of 100° C. and a line pressure of 196 kN/m, and the magnetic layer was not subjected to polishing.

Example 3

A magnetic tape for evaluation was produced in the same manner as in Example 1 except that the calendaring conditions were changed to a temperature of 100° C. and a line pressure of 196 kN/m, and the magnetic layer was not subjected to polishing.

Example 4

A magnetic tape for evaluation was produced in the same manner as in Example 1 except for the following. After forming the non-magnetic layer with the extrusion coater in such a manner that the non-magnetic layer would have a thickness of 1.0 μm after being dried and subjected to calendering, the non-magnetic layer was dried, and then was subjected to calendering at a temperature of 100° C. and a line pressure of 194 kN/m. Subsequently, the magnetic layer was formed on the non-magnetic layer in such a manner that the magnetic layer would have a thickness of 35 nm after being dried and subjected to calendering. After being dried, the magnetic layer was subjected to calendering at a temperature of 100° C. and a line pressure of 196 kN/m. In this Example, the collision type disperser was not used during the preparation of the non-magnetic paint and the magnetic layer was not subjected to polishing.

Example 5

Preparation of Topcoat Layer Paint

Topcoat layer paint components listed in Table 9 were mixed using the stirrer to prepare a topcoat layer paint.

A magnetic tape for evaluation was produced in the same manner as in Example 1 except for the following. The magnetic powder of the magnetic paint components (1) was changed to a barium ferrite (Ba—Fe) magnetic powder (σs: 50 A·m²/kg, Hc: 159 kA/m, average particle size (plate diameter): 20 nm), the thickness of the magnetic layer after being dried and subjected to calendering was changed to 60 nm, the collision type disperser was not used during the preparation of the non-magnetic paint, the application of the orientation magnetic field using the solenoid magnet was not performed, the calendering conditions were changed to a temperature of 100° C. and a line pressure of 196 kN/m, the topcoat layer paint was applied to the magnetic layer after performing calendering, and the magnetic layer was not subjected to polishing.

TABLE 9

| Topcoat layer paint components | Part |
|---|---|
| Stearic acid | 1 |
| Butyl stearate | 1 |
| Isopropyl alcohol | 100 |

Example 6

A magnetic tape for evaluation was produced in the same manner as in Example 5 except that the non-magnetic paint was passed through the collision chamber twice with an orifice diameter of 0.2 mm and a pressurizing condition of 150 MPa using the collision type disperser to redisperse the non-magnetic paint, and the topcoat layer was not formed on the magnetic layer.

Example 7

A magnetic tape for evaluation was produced in the same manner as in Example 5 except for the following. After forming the non-magnetic layer with the extrusion coater in such a manner that the non-magnetic layer would have a thickness of 1.0 μm after being dried and subjected to calendering, the non-magnetic layer was dried, and then was subjected to calendering at a temperature of 100° C. and a line pressure of 294 kN/m. Subsequently, the magnetic layer was formed on the non-magnetic layer in such a manner that the magnetic layer would have a thickness of 30 nm after being dried and subjected to calendering. After being dried, the magnetic layer was subjected to calendering at a temperature of 100° C. and a line pressure of 294 kN/m. In this Example, the topcoat layer was not formed on the magnetic layer.

Example 8

A magnetic tape for evaluation was produced in the same manner as in Example 5 except for the following. After forming the non-magnetic layer with the extrusion coater in such a manner that the non-magnetic layer would have a thickness of 1.0 μm after being dried and subjected to calendering, the non-magnetic layer was dried, and then was subjected to calendering twice at a temperature of 100° C. and a line pressure of 294 kN/m. Subsequently, the magnetic layer was formed on the non-magnetic layer in such a manner that the magnetic layer would have a thickness of 100 nm after being dried and subjected to calendering. After being dried, the magnetic layer was subjected to calendering at a temperature of 100° C. and a line pressure of 196 kN/m. In this Example, the topcoat layer was not formed on the magnetic layer.

Example 9

A magnetic tape for evaluation was produced in the same manner as in Example 6 except that hexagonal strontium ferrite powder (Sr—Fe2) prepared by the following method was employed as a magnetic powder, instead of the barium ferrite (Ba—Fe) magnetic powder.

At first, 1,725 g of $SrCO_3$, 666 g of $H_3BO_3$, 1,332 g of $Fe_2O_3$, 52 g of $Al(OH)_3$, 34 g of $CaCO_3$, and 141 g of $BaCO_3$ were weighed, and were then mixed with a mixer to obtain a raw material mixture.

The obtained raw material mixture was dissolved in a platinum crucible at a melting temperature of 1380° C., a tap hole provided on the bottom of the platinum crucible was heated while stirring the melted liquid, and the melted liquid was extracted in a rod shape at approximately 6 g/sec. The extracted liquid was rolled and rapidly cooled with a water-cooled twin roller to manufacture an amorphous material.

Then, 280 g of the obtained amorphous material was placed in an electric furnace, the temperature in the electric furnace was raised to 645° C. (crystallization temperature), and the amorphous material was still stood in the electric furnace for 5 hours at the same temperature, to precipitate (crystalize) hexagonal strontium ferrite particles.

Subsequently, the above-obtained crystal containing hexagonal strontium ferrite particles was roughly ground in a mortar, and the ground crystals was put in a glass bottle, together with 1000 g of zirconia beads having a particle diameter of 1 mm and 800 ml of acetic acid having a concentration of 1% and were subjected to a dispersion treatment for 3 hours with a paint shaker. Thereafter, the obtained dispersion was separated from the beads and put in a stainless beaker. The dispersion was stood still at a liquid temperature of 100° C. for 3 hours to dissolve a glass component, and thereafter centrifuged in a centrifugal separator to precipitation and were repeatedly decanted to wash the precipitated matter and the precipitated matter is dried in a furnace at an in-furnace temperature of 110° C. for 6 hours, to obtain hexagonal strontium ferrite powder.

The obtained hexagonal strontium ferrite powder had an average particle size of 19 nm, an activation volume of 1102 $nm^3$, an anisotropy constant Ku of $2.0 \times 10^5$ $J/m^3$, and a mass magnetization as of 50 $A \cdot m^2/kg$.

Example 10

A magnetic tape for evaluation was produced in the same manner as in Example 6 except that hexagonal strontium ferrite powder (Sr—Fe1) prepared by the following method was employed as a magnetic powder, instead of the barium ferrite (Ba—Fe) magnetic powder.

1,707 g of $SrCO_3$, 687 g of $H_3BO_3$, 1,120 g of $Fe_2O_3$, 45 g of $Al(OH)_3$, 24 g of $BaCO_3$, 13 g of $CaCO_3$, and 235 g of $Nd_2O_3$ were weighed and mixed with a mixer to obtain a raw material mixture.

The obtained raw material mixture was melted in a platinum crucible at a melting temperature of 1,390° C., a tap hole provided on the bottom of the platinum crucible was heated while stirring the melted liquid, and the melted liquid was extracted in a rod shape at approximately 6 g/sec. The extracted liquid was rolled and rapidly cooled with a water-cooled twin roller to manufacture an amorphous material.

280 g of the manufactured amorphous material was put into an electric furnace and heated to 635° C. (crystallization temperature) at a rate of temperature increase of 3.5° C./min, and held at the same temperature for 5 hours, to precipitate (crystallize) hexagonal strontium ferrite particles.

Then, a crystalline material obtained above including the hexagonal strontium ferrite particles was coarsely crushed with a mortar and subjected to a dispersion process with a paint shaker for 3 hours, by adding 1,000 g of zirconia beads having a particle diameter of 1 mm and 800 ml of acetic acid having a concentration of 1% in a glass bottle. After that, the obtained dispersion liquid was separated from the beads and put into a stainless steel beaker. A dissolving process of the glass component was performed by leaving the dispersion liquid at a liquid temperature of 100° C. for 3 hours, the precipitation was performed with a centrifugal separator, decantation was repeated for washing, and the resultant material was dried in a heating furnace at a temperature in the furnace of 110° C. for 6 hours, thereby obtaining hexagonal strontium ferrite powder.

The hexagonal strontium ferrite powder obtained above had an average particle size of 18 nm, an activation volume of 902 $nm^3$, an anisotropy constant of $2.2 \times 10^5 J/m^3$, and a mass magnetization as of 49 $A \cdot m^2/kg$.

12 mg of sample powder was collected from the hexagonal strontium ferrite powder obtained above, element analysis of filtrate obtained by partially dissolving the sample powder under the dissolving conditions exemplified above was performed by the ICP analysis device, and the surface portion content of neodymium atom was obtained.

Separately, 12 mg of sample powder was collected from the hexagonal strontium ferrite powder obtained above, element analysis of filtrate obtained by totally dissolving the sample powder under the dissolving conditions exemplified above was performed by the ICP analysis device, and the surface portion content of neodymium atom was obtained.

In the hexagonal strontium ferrite powder, the content (bulk content) of neodymium atom with respect to 100 atom % of iron atom was 2.9 atom %, and the surface portion content of neodymium atom was 8.0 atom %. The "surface portion content/bulk content", that is a ratio of the surface portion content to the bulk content, was 2.8. It was confirmed that the neodymium atom was unevenly distributed in the surface portion of the particles.

The X-ray diffraction analysis of the powder obtained above was performed by scanning with a CuKα ray at a voltage of 45 kV and intensity of 40 mA and by measuring X-ray diffraction pattern under the conditions. By the X-ray diffraction analysis, it was confirmed that the powder obtained above showed the crystal structure of hexagonal ferrite. The powder obtained above showed a crystal structure of magnetoplumbite type (M type) hexagonal ferrite. In addition, a crystal phase detected by the X-ray diffraction analysis was a magnetoplumbite type single phase.

PANalytical X'Pert Pro diffractometer, PIXcel detector
Soller slit of incident beam and diffraction beam: 0.017 radians
Fixed angle of dispersion slit: ¼ degrees
Mask: 10 mm
Scattering prevention slit: ¼ degrees
Measurement mode: continuous
Measurement time per 1 stage: 3 seconds
Measurement speed: 0.017 degrees per second
Measurement step: 0.05 degrees Comparative Example 1

A magnetic tape for evaluation was produced in the same manner as in Example 1 except that the collision type disperser was not used during the preparation of the non-magnetic paint, the calendering conditions were changed to a temperature of 100° C. and a line pressure of 196 kN/m, and the magnetic layer was not subjected to polishing.

Comparative Example 2

A magnetic tape for evaluation was produced in the same manner as in Example 1 except that the calendering conditions were changed to a temperature of 100° C. and a line pressure of 196 kN/m, the magnetic layer was not subjected to polishing, and the content of the stearic acid (as listed in Table 9 as a topcoat layer component) in the topcoat layer paint was changed to 2 parts, and this topcoat layer paint was applied onto the magnetic layer.

Comparative Example 3

A magnetic tape for evaluation was produced in the same manner as in Example 1 except that after being subjected to polishing using the polishing wheel the magnetic layer was further cleaned with a lapping tape (#20000, manufactured by Nihon Micro Coating Co., Ltd.), and then dirt on the surface of the magnetic layer was removed with a cleaning tissue.

Comparative Example 4

A magnetic tape for evaluation was produced in the same manner as in Example 1 except that the thickness of the magnetic layer after being dried and subjected to calendering was changed to 75 nm, the collision type disperser was not used during the preparation of the non-magnetic paint, the calendering conditions were changed to a temperature of 100° C. and a line pressure of 196 kN/m, and the magnetic layer was not subjected to polishing.

Comparative Example 5

A magnetic tape for evaluation was produced in the same manner as in Example 5 except for the following. After forming the non-magnetic layer with the extrusion coater in such a manner that the non-magnetic layer would have a thickness of 1.0 μm after being dried and subjected to calendering, the non-magnetic layer was dried, and then was subjected to calendering twice at a temperature of 100° C. and a line pressure of 294 kN/m. Subsequently, the magnetic layer was formed on the non-magnetic layer in such a manner that the magnetic layer would have a thickness of 25 nm after being dried and subjected to calendering. After being dried, the magnetic layer was subjected to calendering at a temperature of 100° C. and a line pressure of 196 kN/m. In this Comparative Example, the topcoat layer was not formed on the magnetic layer.

The S/N ratio of each of the magnetic tapes for evaluation produced in Examples 1 to 8 and Comparative Examples 1 to 5 was measured in the following manner to evaluate the transport durability of each magnetic tape. Further, for each of the magnetic tapes, t as the average thickness of the magnetic layer, L1 as the average thickness of the first mixed layer and L2 as the average thickness of the second mixed layer were measured by the layer thickness measuring method of the present invention described above. Further, Mr·t of the magnetic layer was measured.

Measurement of S/N Ratio

A signal with a recording wavelength of 220 nm was recorded onto each magnetic tape at a tape speed of 1.5 m/sec using an apparatus for measuring magnetic recording properties of linear tapes equipped with an MR head (write track width: 11 μm, write gap length: 0.35 μm, read track width: 6 μm, read shield to shield gap length: 160 nm). Note that the apparatus was obtained by modifying an LTO drive. After amplifying the reproduced signal with a commercially available Read amplifier for MR heads, a fundamental wave component output (S) and integrated noise (N) of the signal were measured using a spectrum analyzer N9020A manufactured by Agilent Technologies, Inc to calculate the S/N ratio. The results are provided in Tables 10 and 11. In Tables 10 and 11, the S/N ratio of Comparative Example 1 is taken as a reference (0 dB), and each S/N ratio is provided as a relative value (dB).

Evaluation of Transport Durability

After transporting each magnetic tape in its entire length 10000 passes (5000 round trips) using the apparatus for measuring magnetic recording properties of linear tapes, an output from each tape was measured. The transport durability was evaluated based on the extent of decline in output (dB) from the initial output prior to performing the 10000 passes of transport in an environment at 45° C. and 10% RH. The results are provided in Tables 10 and 11.

Measurement of t, L1 and L2

By the layer thickness measuring method of the present invention described above, t as the average thickness of the magnetic layer, L1 as the average thickness of the first mixed layer and L2 as the average thickness of the second mixed layer were measured. The results are provided in Tables 10 and 11.

Measurement of Mr·t

The value of residual magnetization measured using a sample vibration type magnetometer at 25° C. and an applied magnetic field of 796.3 kA/m was divided by the plane area of the measured sample to determine Mr·t.

TABLE 10

| | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|
| Magnetic powder | Fe | Fe | Fe | Fe | Ba—Fe | Ba—Fe | Ba—Fe | Ba—Fe | Sr—Fe2 | Sr—Fe1 |
| Mr·t (μT·m) | 0.0125 | 0.0150 | 0.0125 | 0.0088 | 0.0050 | 0.0050 | 0.0020 | 0.0084 | 0.0020 | 0.0020 |
| t (nm) | 50 | 60 | 50 | 35 | 60 | 60 | 30 | 100 | 30 | 30 |
| L1 (nm) | 2 | 4 | 4 | 3 | 6 | 4 | 3 | 4 | 4 | 3 |
| L2 (nm) | 20 | 25 | 20 | 15 | 25 | 20 | 12 | 10 | 14 | 12 |
| L2/t | 0.40 | 0.42 | 0.40 | 0.43 | 0.42 | 0.33 | 0.40 | 0.10 | 0.47 | 0.40 |
| S/N ratio (db) | 1.5 | 0.6 | 0.9 | 1.4 | 0.5 | 1.5 | 0.8 | 0.7 | 2.5 | 2.7 |
| Decline in output (db) | −1.7 | −0.8 | −1.2 | −1.5 | −0.2 | −1.3 | −1.6 | −0.5 | −1.1 | −1.2 |

TABLE 11

|  | Comp. Ex. 1 | Comp. Ex. 2 | Comp. Ex. 3 | Comp. Ex. 4 | Comp. Ex. 5 |
|---|---|---|---|---|---|
| Magnetic powder | Fe | Fe | Fe | Fe | Ba—Fe |
| Mr · t (µT · m) | 0.0125 | 0.0125 | 0.0125 | 0.0188 | 0.0019 |
| t (nm) | 50 | 50 | 50 | 75 | 25 |
| L1 (nm) | 4 | 7 | 1 | 4 | 3 |
| L2 (nm) | 25 | 20 | 20 | 25 | 10 |
| L2/t | 0.50 | 0.40 | 0.40 | 0.33 | 0.40 |
| S/N ratio (db) | 0 | −0.2 | 1.9 | −0.1 | 0.7 |
| Decline in output (db) | −1 | −0.1 | −2.8 | −0.3 | −2.3 |

As can be seen from Tables 10 and 11, the magnetic tapes of the present invention produced in Examples 1 to 8 each had an excellent S/N ratio, a small decline in output after being transported. These results indicate that they can be used at a practical level without any problems. In contrast, Comparative Example 1 in which L2/t was more than 0.45 had a small S/N ratio, Comparative Example 2 in which L1 was more than 6 nm had a small S/N ratio, Comparative Example 3 in which L1 was less than 2 nm had a large decline in output, Comparative Example 4 in which Mr·t was more than 0.0150 µT·m had a small S/N ratio, and Comparative Example 5 in which Mr·t was less than 0.0020 µT·m had a large decline in output.

The invention may be embodied in other forms without departing from the spirit of essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A magnetic recording medium comprising: a non-magnetic substrate; a non-magnetic layer formed on one of principal surfaces of the non-magnetic substrate; and a magnetic layer formed on a principal surface of the non-magnetic layer opposite to the non-magnetic substrate, wherein the magnetic layer contains a magnetic powder,
the magnetic powder is a hexagonal strontium ferrite magnetic powder,
Mr and t satisfy 0.0020 µT·m≤Mr·t≤0.0150 µT·m, where Mr is the residual magnetic flux density of the magnetic layer, and t is the average thickness of the magnetic layer,
L1 satisfies 2 nm≤L1≤6 nm, where L1 is the average thickness of a first mixed layer that is formed on the surface of the magnetic layer opposite to the non-magnetic layer,
L2 satisfies 0.1≤L2/t≤0.45, where L2 is the average thickness of a second mixed layer that is formed on the surface of the magnetic layer facing the non-magnetic layer,
the first mixed layer is high in lubricant, resin, filler and void contents as compared with the magnetic layer,
a content of magnetic components per unit volume of the first mixed layer is lower than a content of magnetic components per unit volume of the magnetic layer,
the magnetic layer has the average thickness of 20 to 100 nm,
wherein the average thickness t of the magnetic layer represents a distance between a first peak and a second peak of a differential curve that is derived from a luminance curve, the luminance curve being fowled by observing a cross section of the magnetic recording medium with a YAG detector to obtain a backscattered electron image of the cross section, determining values of luminance of the cross section from the backscattered electron image, and averaging the values of luminance of the cross section, and
when an average of luminance of the non-magnetic layer is taken as 0 and a highest luminance of the magnetic layer is taken as 100 in the luminance curve, the average thickness L1 of the first mixed layer represents an average thickness of an area on a side of the magnetic layer opposite to the non-magnetic layer, where the value of luminance is in a range of 70 to 30, and the average thickness L2 of the second mixed layer represents an average thickness of an area on a side of the magnetic layer facing the non-magnetic laver, where the value of luminance is in a range of from 70 to 30.

2. The magnetic recording medium according to claim 1, wherein L1 satisfies 2 nm≤L1≤4 nm, and L2 satisfies 0.1≤L2/t≤0.40.

3. The magnetic recording medium according to claim 1, wherein the magnetic powder has an average particle size of 10 to 35 nm.

4. The magnetic recording medium according to claim 1, wherein the magnetic layer has a thickness of 30 to 70 nm.

5. The magnetic recording medium according to claim 1, wherein the magnetic layer has Ra of 1.0 nm or more and less than 2.0 nm, where Ra is centerline average roughness defined in JIS B0601.

6. The magnetic recording medium according to claim 1, wherein the non-magnetic layer has a thickness of 0.1 to 3 µm.

* * * * *